United States Patent [19]

Waugh et al.

[11] Patent Number: 5,661,615
[45] Date of Patent: Aug. 26, 1997

[54] DETECTION OF MECHANICAL DEFECTS IN A DISC DRIVE USING RESONANT FREQUENCIES

[75] Inventors: David C. Waugh, Oklahoma City; Michael A. Rider, Yukon, both of Okla.

[73] Assignee: Seagate Technology, Inc., Scotts Valley, Calif.

[21] Appl. No.: 499,388

[22] Filed: Jul. 7, 1995

[51] Int. Cl.⁶ .................................................. G11B 21/02
[52] U.S. Cl. ................................. 360/75; 360/78.04
[58] Field of Search .................... 360/6, 69, 78.01, 360/78.06, 78.04, 78.14, 75; 369/53, 56, 57, 44.28, 44.32, 44.34, 54; 324/212; 73/579

[56] References Cited

U.S. PATENT DOCUMENTS

| | | | |
|---|---|---|---|
| 4,321,517 | 3/1982 | Touchton et al. | 318/618 |
| 4,477,755 | 10/1984 | Rickert | 360/78.09 X |
| 4,638,230 | 1/1987 | Lee | 360/78.06 X |
| 4,912,978 | 4/1990 | Solmos | 73/579 |
| 5,227,982 | 7/1993 | Kipple et al. | 73/579 X |
| 5,262,907 | 11/1993 | Duffy et al. | 360/77.05 |
| 5,425,272 | 6/1995 | Rhodes et al. | 73/579 |

*Primary Examiner*—Andrew L. Sniezek
*Assistant Examiner*—Larry T. Cullen
*Attorney, Agent, or Firm*—Bill D. McCarthy; Edward P. Heller, III; Randall K. McCarthy

[57] ABSTRACT

A method and apparatus for testing for mechanical defects in a disc drive during manufacturing test is disclosed. The disc drive performs a special test seek to a destination track involving maximum acceleration and deceleration current to induce resonant frequencies in an actuator servo position error (SPE) signal. During track following on the destination track, the SPE is filtered by a sample and accumulate operation, resulting in the detection and characterization of the resonant frequency. The characteristics of the detected and characterized resonant frequency are compared to predetermined maximum acceptable threshold values, and when the characteristics exceed the threshold values an error flag is set, indicating a failure condition for the disc drive, enabling the disc drive to be removed from test for subsequent remedial actions.

13 Claims, 13 Drawing Sheets

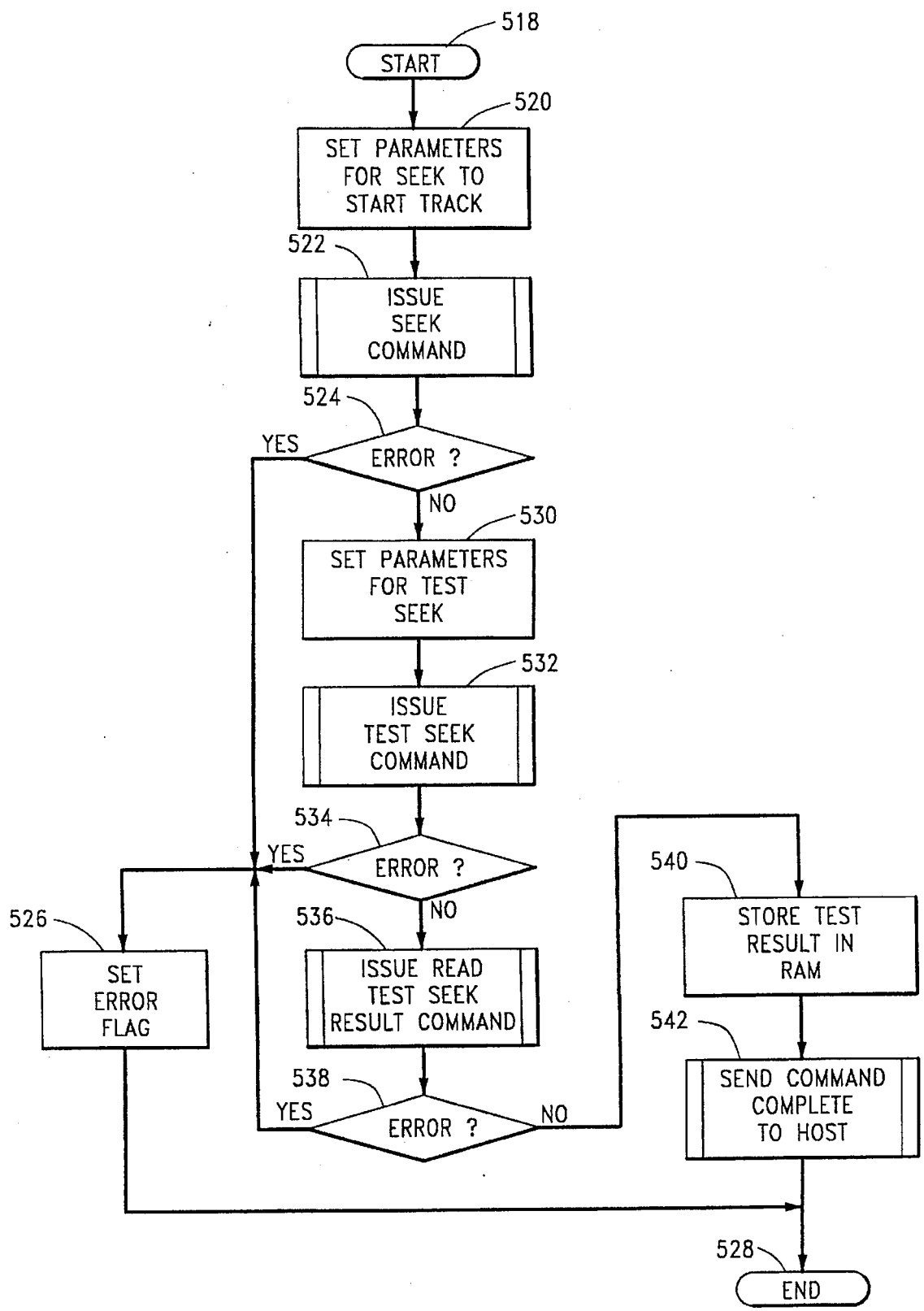

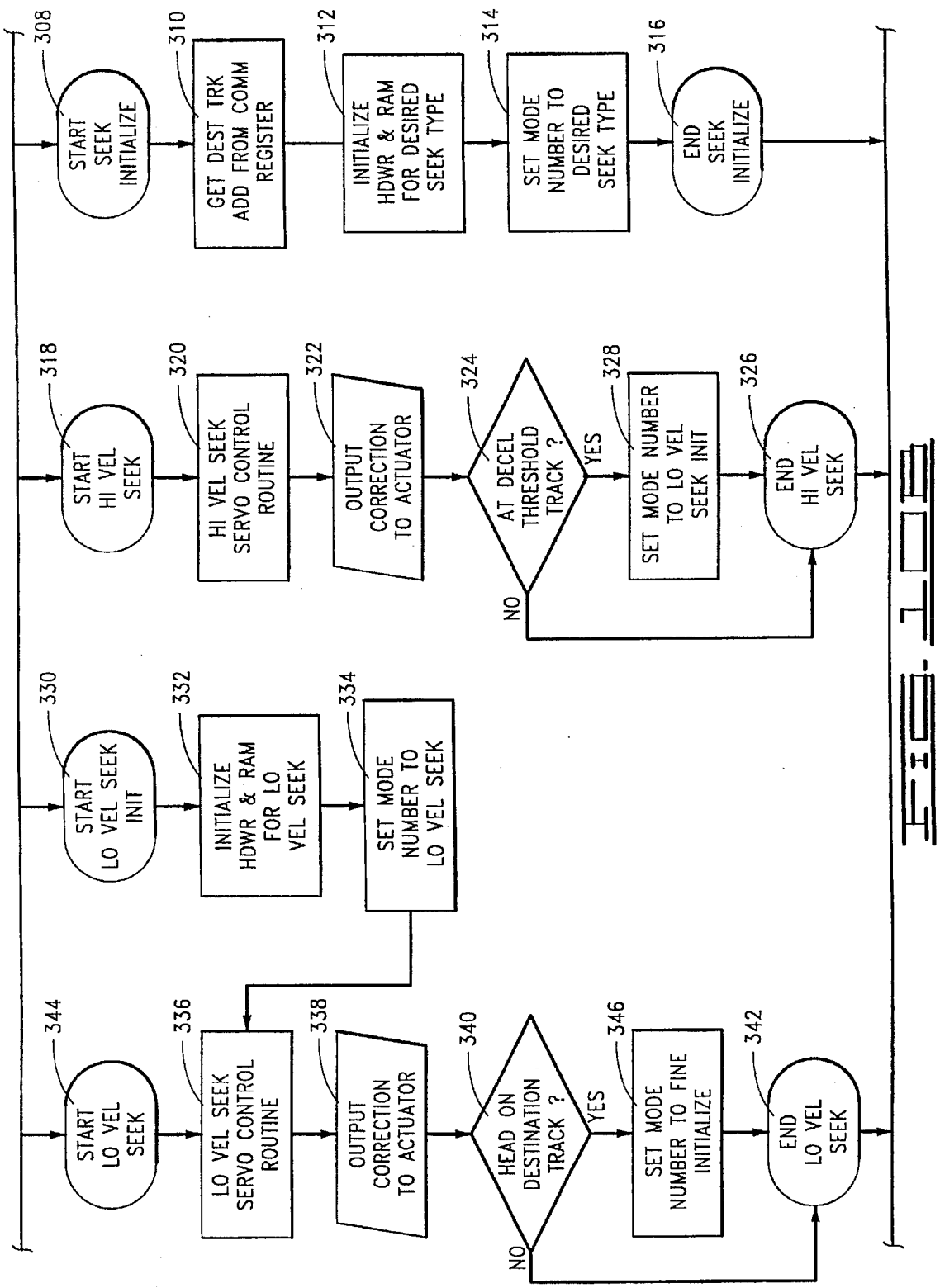

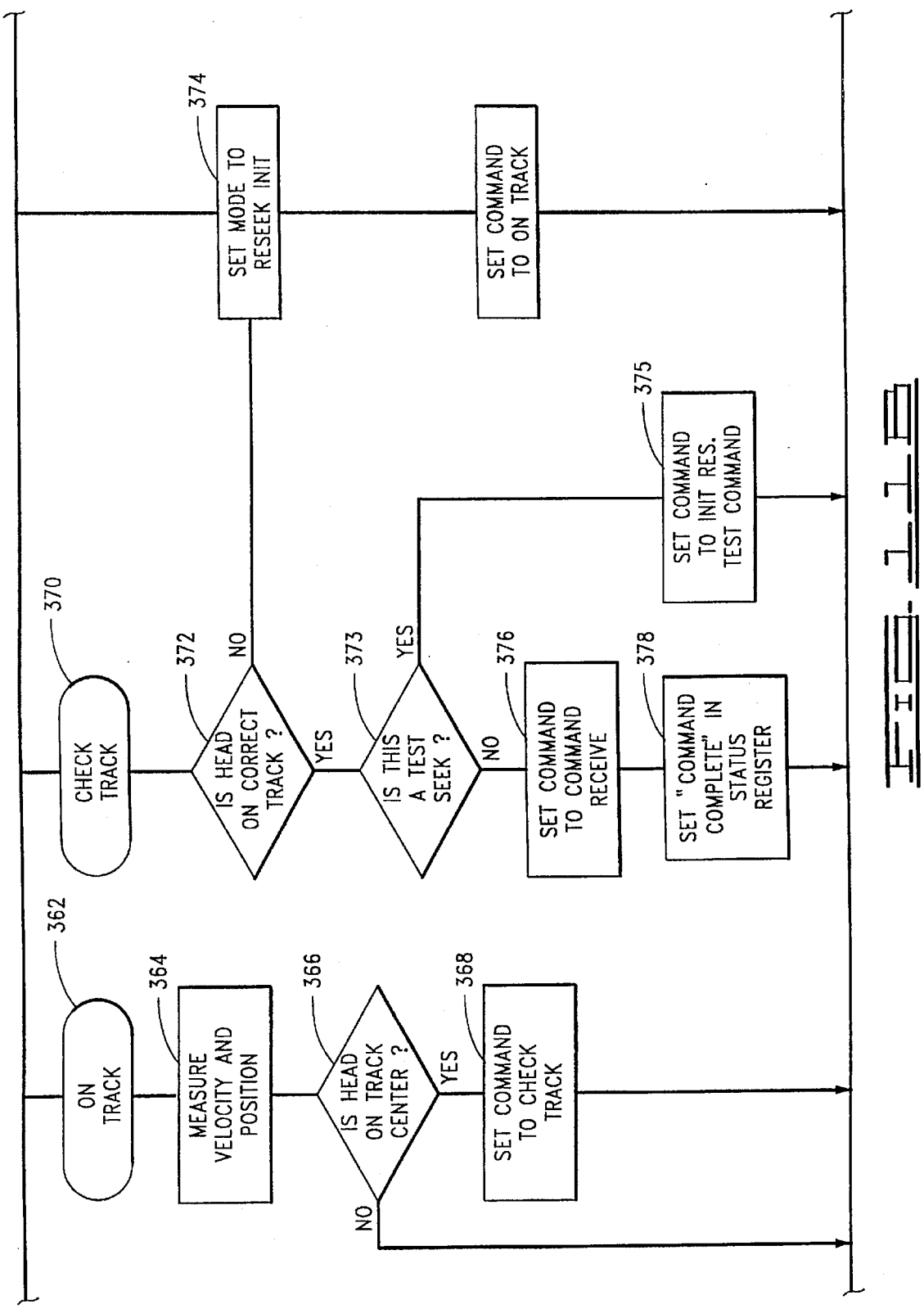

DETECTION OF MECHANICAL DEFECTS IN A DISC DRIVE USING RESONANT FREQUENCIES

BACKGROUND OF THE INVENTION

1. Field of the Invention

This invention relates generally to the field of disc drive data storage devices, and more particularly, but not by way of limitation, to a method and apparatus for the detection of certain mechanical defects in a disc drive.

2. Discussion of the Prior Art

Disc drives of the type referred to as "Winchester" disc drives are well-known in the industry. In such devices, one or more rigid discs, coated with a magnetizable medium, are mounted on the hub of a spindle motor for rotation at a constant high speed. Disc drives of the present generation use spindle motors rotating at up to 7200 RPM.

Information is stored on the discs in a plurality of concentric circular tracks by an array of transducers, or heads (usually one per disc surface) mounted for movement to an electronically controlled actuator mechanism. The storing of information on the discs is sometimes also referred to as "writing", and the subsequent retrieval of information from the discs is also called "reading".

Presently, the most commonly used type of actuator mechanism is the rotary voice coil actuator, sometimes referred to as a rotary moving-coil actuator. With this type of actuator, the transducers used to write and read data are mounted via flexures at the ends a plurality of head arms which project radially outward from a substantially cylindrical actuator body. The actuator body is journaled via ball bearing assemblies to rotate about a pivot shaft which is mounted to the disc drive housing at a position closely adjacent the outer extreme of the discs. The pivot shaft is intended to be in parallel with the axis of rotation of the spindle motor and the discs. The transducers will thus move in a plane parallel with the surfaces of the discs.

A coil is mounted on the side of the actuator body opposite the head arms. The coil is mounted so as to be immersed in the magnetic field of an array of permanent magnets which are in turn mounted to the disc drive housing. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Control of the movement of the heads is achieved with a closed loop servo system and details of such a servo system can be found in U.S. Pat. No. 5,262,907 issued to Duffy et al., assigned to the assignee of the present invention and incorporated herein by reference. In such a system, position or servo information is prerecorded on at least one surface of one of the discs. The servo system can be either a "dedicated" servo system, in which one entire disc surface is prerecorded with the servo information and a dedicated servo head is used to constantly read the servo information, or an "embedded" servo system, in which servo information is interleaved with user data and intermittently read by the same heads used to read and write the user data.

With either a dedicated or embedded servo system, it is common that the servo circuitry produce a servo position error (SPE) signal which is indicative of the position of the head relative to the center of a track. The identity of the particular track, as well as other information relating to the circumferential position of the head on the track, is included, along with other information, in the prerecorded servo information. Thus, when the heads are following a desired track, the SPE is essentially at a zero value. The SPE is fed back to circuitry used to control current through the coil of the actuator. Any tendency of the heads to deviate from true track center causes the SPE to change from its zero value. The SPE is a bipolar analog signal, meaning that deviation of the head position away from track center in a first direction will produce a SPE of a first polarity, while movement of the heads off track center in the opposite direction will produce an SPE of the opposite polarity, and the greater the distance of the head from track center, the greater the magnitude of the SPE signal. It should be noted that the SPE signal relates to each track centerline, and, as such, when the actuator is seeking from one track to another, the SPE signal switches from maximum offset value from a first track in a first direction to maximum offset value from a second track in the opposite direction as the moving head passes the midpoint between the first and second tracks.

In the manufacture of disc drives, it is not unusual for tens of thousands of disc drive units to be fabricated daily. With such high numbers of disc drives being made, it is apparent that a certain number of units will fail to meet the design specifications, due to faulty components, improper assembly, contamination, and other elements familiar to those of skill in the art. While every effort is made by disc drive manufacturers to minimize these defective units and assembly errors, a small percentage of defective units will occur. When the defect is introduced into the unit at an early stage in the manufacturing process, the fault may not be detected until a much later stage of the process. Such a delay in the detection of defective assemblies can result in a significant amount of labor costs when taken over the large numbers of units being manufactured.

It has been found that several mechanical defects that can commonly be introduced into the assembly of a disc drive can be closely correlated to the introduction of susceptibility of the unit to resonances at fixed "marker" frequencies. This correlation has come about empirically with the experience of building hundreds of thousands of identical products. With this knowledge, it follows that if the disc drive units can be tested for resonance at the marker frequencies, early detection of the manufacturing defects is possible.

It has been found that resonant frequencies in a mechanical structure can sometimes be identified through the use of a frequency analyzer which, once properly connected to the structure to be tested, injects energy at a selected frequency and then evaluates the structure for gain in the energy which would be indicative of resonance. While the use of a frequency analyzer as an engineering diagnostic tool is well known in the industry, it does have several drawbacks which make such use impractical for large-scale implementation in disc drive manufacturing test operations. Firstly, a frequency analyzer is a complex and expensive piece of diagnostic test equipment, costing several thousand dollars per unit. In a manufacturing environment producing tens of thousands of units per day, a large number of frequency analyzers would be needed in order to provide adequate test capability for the quantity of drives being manufactured, resulting in economically prohibitive capital costs for the manufacturer. Secondly, connecting an analyzer to each structure to be tested and performing the test would require both an operator and a significant amount of time, two elements antithetical to such a high volume production environment. Thirdly, the implementation of automated test result reporting and evaluation with such discrete test equipment would be difficult and resource intensive.

It has also been found that testing for sympathetic resonances in a structure can be accomplished by mounting the unit to be tested to a vibration table, and then injecting either sinusoidal or random vibration energy into the unit during operation and then monitoring for resonant frequencies using suitable test equipment. Again, such a method, although useful during development of a disc drive, would be economically impractical for implementation during large scale manufacture due to capital equipment and resource requirements.

It would, therefore, be desirable to provide a method and apparatus for testing for mechanical defects in disc drives by detecting resonances at corresponding marker frequencies, and culling out units failing the test procedure for repair or remanufacture, while allowing passing units to continue onward in the manufacturing process. It would also be preferable if the test methodology involved a minimum of cost, both in human operator time and capital investment.

SUMMARY OF THE INVENTION

The present invention provides a method for testing for mechanical defects in a disc drive using detected resonant frequencies, and apparatus for performing the method. In the preferred embodiment, resonances are excited by performing a special test seek of the disc drive heads. This test seek is accomplished by applying acceleration and deceleration current to the disc drive actuator coil in an abrupt manner, inducing potential resonances across a broad spectrum of frequencies. At the completion of the seek, the servo position error signal, indicative of the relative position of the heads to the centerline of the target track, is sampled and filtered for "marker" frequencies that have been previously determined to be associated with specific mechanical faults in the disc drive assembly. If resonances at these "marker" frequencies are not present, it is assumed that the mechanical defect in question is not present, and the disc drive unit continues on to succeeding stages of the manufacturing process. If, however, resonances at the "marker" frequencies are found, the disc drive is pulled out of the manufacturing process for repair or remanufacture. The filtering may be accomplished using a discrete Fourier transform (DFT).

It is an object of the present invention to provide a method and apparatus for testing for specific mechanical defects in a disc drive by the detection of resonant frequencies that have been empirically associated with the specific mechanical defect.

It is another object of the invention to provide the test method and apparatus for performing the test method in a manner that is cost-effective in terms of labor, time and capital investment.

Other objects, advantages and features of the present invention will be apparent from the following description when read in conjunction with the drawings and appended claims.

BRIEF DESCRIPTION OF THE DRAWINGS

The features, benefits and objects of the invention can be best understood from the following detailed description of the invention when read in conjunction with the following drawings.

FIG. 6 is a flow diagram of the program executed by one of the host computer systems shown in FIG. 5.

FIG. 7 is a flow diagram of the microprogram executed by the system microprocessor as a result of the execution of one of the commands of the program illustrated in FIG. 6.

FIG. 8 is a flow diagram of the microprogram executed by the system microprocessor as a result of the execution of a second of the commands of the program illustrated in FIG. 6.

FIGS. 10A–10C are flow diagrams of the top level interrupt service routine executed by the servo microprocessor of the servo system of FIGS. 2 and 4.

DETAILED DESCRIPTION OF THE PREFERRED EMBODIMENT

Figure 1:
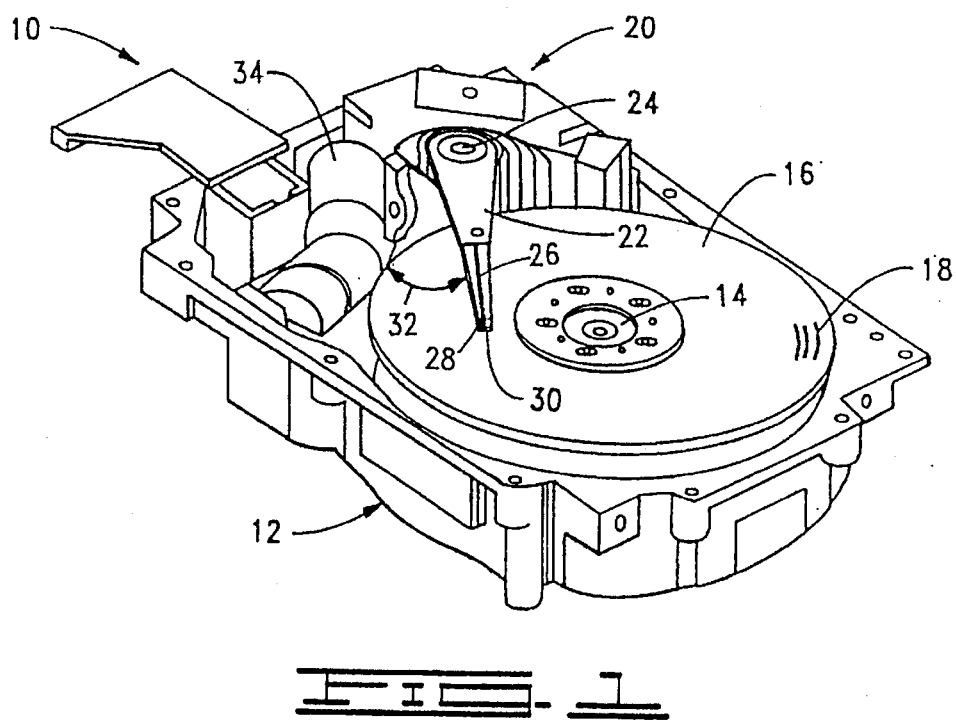
FIG. 1 is a perspective view of a disc drive in which the present invention is particularly useful.

Turning now to the drawings and more particularly to FIG. 1, shown is a partially exploded isometric view of a disc drive 10 of the type in which the present invention is particularly useful. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14 using a disc clamp (not designated). In this example, the disc clamp is secured using screws (also not designated) equally spaced about the perimeter of the disc clamp. An array of heads (one shown at 30) is mounted via flexure assemblies 26 to an actuator body which is adapted for pivotal motion about a pivot shaft 24 under control of an actuator motor, shown generally at 20.

The actuator motor 20 is driven by electronic circuitry (not shown) to controllably move the heads 30 to any desired one of a plurality of concentric circular tracks 18 on the discs 16 along arcuate path 32. Signals used to control the actuator motor, as well as signals to and from the heads 30, are passed via a printed circuit cable 34.

Because the disc drive 10 illustrated in FIG. 1 includes an actuator motor 20 of the type known as a voice coil motor (VCM), or moving coil motor, the disc drive 10 must also include electronic control logic for moving the heads 30 to any one track 18, and maintaining the heads 30 closely adjacent the track for storing and retrieving data. This control logic is usually referred to as a servo system, and a typical servo system is shown in FIG. 2.

Figure 2:
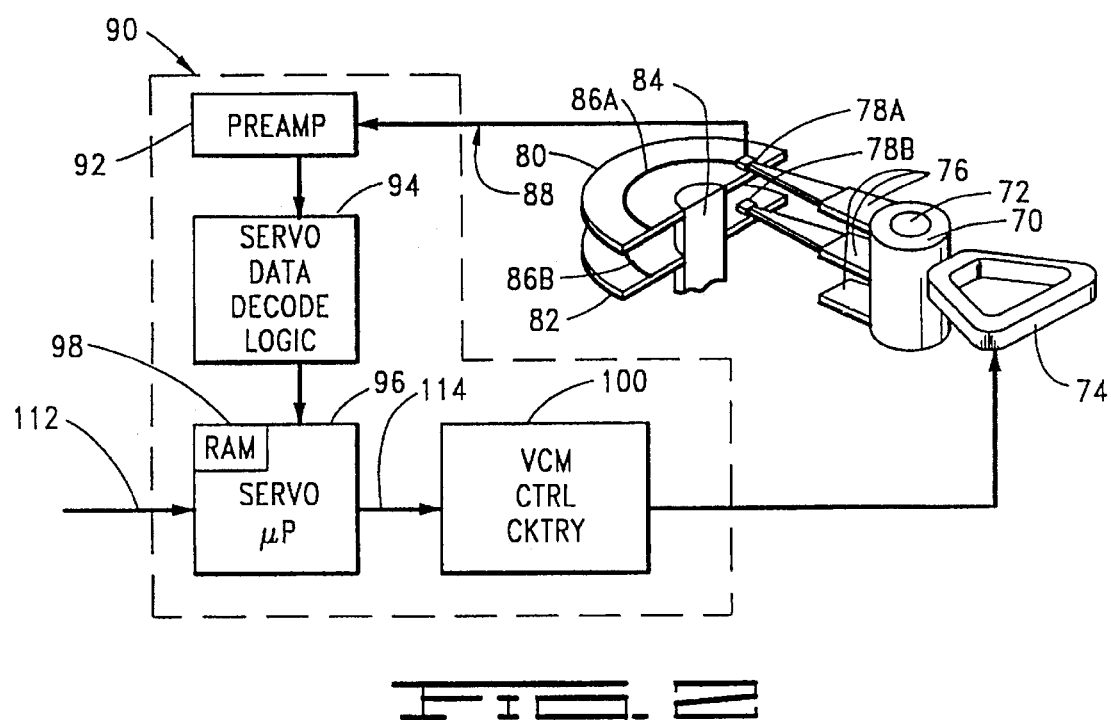
FIG. 2 is a block diagram of the servo system used to control the actuator of the disc drive of FIG. 1.

FIG. 2 is a simplified block diagram of a servo system in which the present invention is particularly useful. Shown in FIG. 2 is an actuator body 70 which pivots about a pivot shaft 72 when drive current is applied to a coil 74 which lies between a pair of permanent magnets (not shown). On the opposite side of the actuator body 70 from the coil 74 is a plurality of head mounting arms 76 which in turn support a number of heads, two of which have been shown as 78A, 78B are arrayed to cooperate with a stack of discs 80, 82 mounted for rotation on a spindle motor 84. While, in actual disc drives, there could be a larger number of discs, and a head associated with each disc surface, for purposes of clarity, only two discs 80, 82 and two heads 78A, 78B are shown.

For this and the following discussion, it will be assumed that the disc drive 10 of the present discussion employs a dedicated servo system, so that the top head 78A is a servo head and the top surface of the top disc 80 is a servo disc that contains prerecorded positional servo information. It will be recognized, however, that the present invention is not dependent upon the use of a particular type of servo system, and that the present invention could be utilized in a disc drive employing an embedded servo system.

Returning to FIG. 2, for clarity all other heads and discs will be referred to as "data heads" or "read/write heads" and "data discs", respectively. As will be recognized, the basic principle of operation of the servo system is that, if the servo head 78A can be made to seek to and follow a given servo track 86A on the servo disc 80, all data heads 78B will simultaneously seek to and follow corresponding data tracks 86B. To facilitate this seeking and track following, servo data 88 read from the servo disc 80 is directed into a servo loop 90 which consists of a preamplifier 92, servo data decode logic 94 which includes an analog-to-digital (A/D) converter (not separately shown), a servo microprocessor 96 with associated RAM 98 and a VCM control circuit 100, which includes a power amp and a digital-to-analog (D/A) converter (both of which are not separately shown). A detailed description of the servo loop 90 can be found in U.S. Pat. No. 5,262,907 entitled HARD DISC DRIVE WITH IMPROVED SERVO SYSTEM, incorporated herein by reference. Before continuing with this discussion, it is perhaps better at this time to describe the format of the servo information prerecorded on the servo disc 80.

Figure 3:
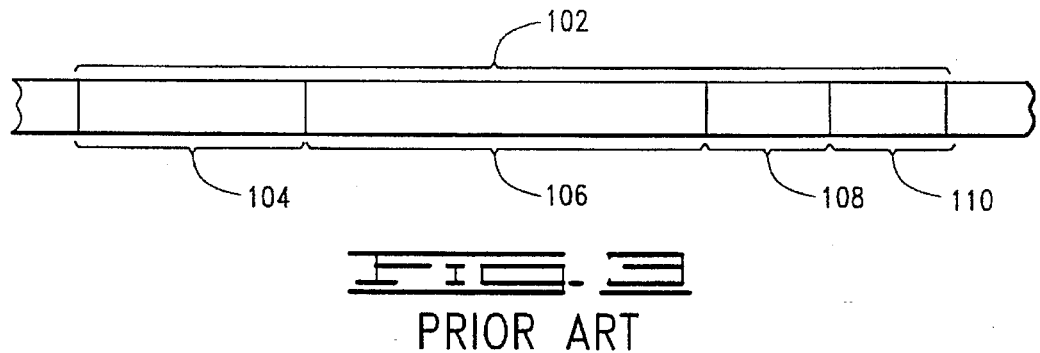
FIG. 3 is a diagrammatic representation of a single frame of servo information for the servo system of FIG. 2.

The servo information on the servo disc 80 is recorded at the time of manufacture using a highly precise servo writer. Servo tracks correspond to the locations of data tracks on the other disc surfaces. Each servo track is divided circumferentially into a fixed number of frames, and the format of one such servo frame is shown in FIG. 3. As shown in FIG. 3, each frame 102 is further divided into four separate fields, specifically an address field 104, a position field 106, a sector field 108, and a sync field 110. The function of the address field 104 is to provide a track address; that is, to define the approximate radial position of the head when the address field 104 is read. The position field 106 is used to define the exact radial position of the servo head relative to the servo track. The sector field 108 is encoded with information defining the circumferential position of the disc relative to the head and the sync field 110 is used to aid in the development of timing signals. Each frame 102 requires approximately 420 nanoseconds to pass below the servo head and there are 400 of these frames 102 per track if the discs 80, 82 are rotating at 3600 RPM, or 300 frames if the discs 80, 82 are rotating at 4800 RPM. Furthermore, the final sync field 110 of the final frame 102 contains special coding to define the beginning of each track and allow the generation of an index signal.

Referring now to both FIGS. 2 and 3, the servo microprocessor 96 runs a loop program waiting for the servo data decode logic 94 to generate the index signal. At specifically timed intervals during the time the servo frame 102 passes under the servo head 78A, an interrupt is sent to the servo microprocessor 96 and the information in the servo frame 102 is read by the servo microprocessor 96, thus keeping the servo microprocessor 96 constantly aware of the radial and circumferential position of the servo head 78A and, therefore, the data heads 78B as well. The use that the servo microprocessor 96 makes of this information depends on the operational mode of the disc drive at the time of the interrupt. That is, if the disc drive is in a track following mode, the servo loop 90 simply decodes the information in the servo frame 102 to maintain the servo head 78A centered on the current track. If, however, the servo microprocessor 96 has received a command to seek from the current track to another track on command path 112, the servo microprocessor 96 sends a digital value on signal path 114 which causes the VCM control circuitry 100 to apply a controlled DC voltage of the proper polarity to begin moving the actuator in a controlled manner to the desired track. The specifics of track following and seeking are described in more detail in U.S. Pat. No. 5,262,907, incorporated hereinabove by reference.

Figure 4:
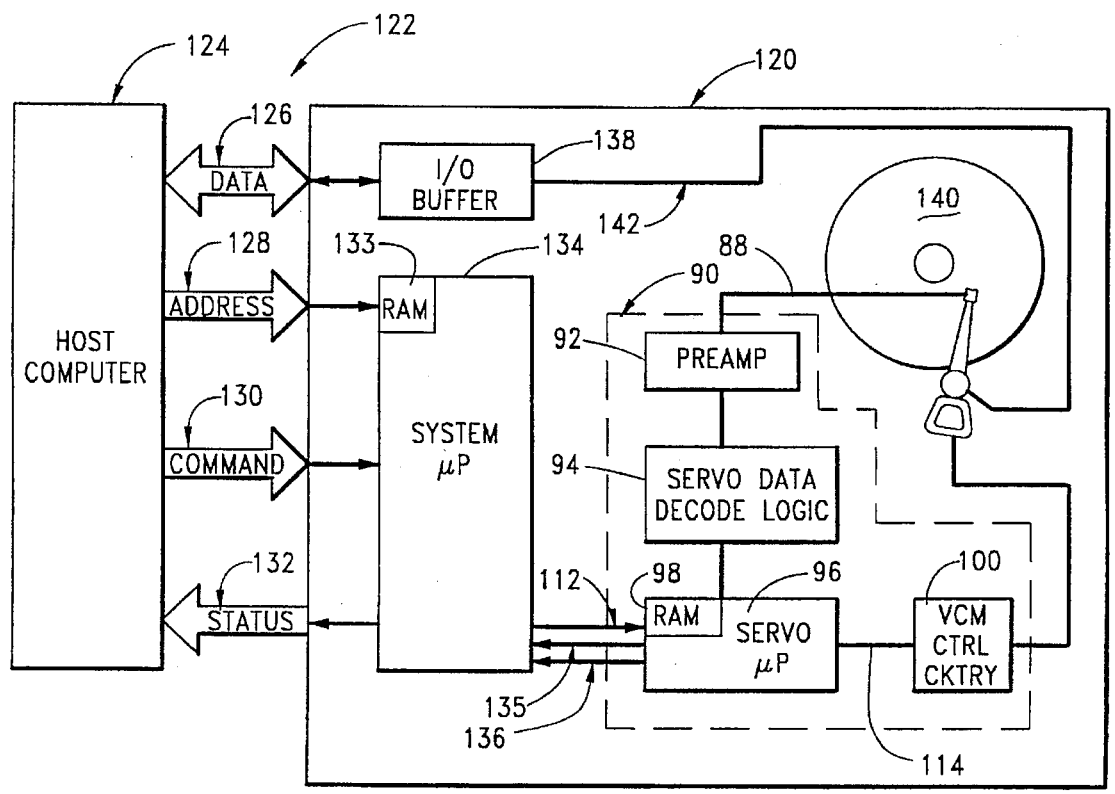
FIG. 4 is a block diagram of the disc drive of FIG. 1 showing the internal electronic circuitry and connection to a host computer system.

An overall system block diagram is shown in FIG. 4, with the servo loop 90 of FIG. 4 included within a disc drive 120. A host interface 122 connects the disc drive 120 to a host computer system 124. Although FIG. 4 shows a single disc drive 120 connected to the host computer 124, the host interface 122 is typically capable of connecting and supporting a plurality of individual disc drives. The host interface 122 includes a bi-directional data bus 126, an address bus 128 for passing logical bus addresses (LBAs) from the host computer 124 to the disc drive 120, a command bus 130, and a status bus 132. The disc drive 120 also contains a system microprocessor 134, the primary function of which is to receive, decode and execute commands from the host computer system 124. These commands are carried to the disc drive 120 by way of the command bus 130. A typical interface of this type may be a SCSI (Small Computer System Interface) Bus.

The SCSI Bus commands define the disc storage space in terms of LBAs. One of the functions of the system microprocessor 134 in the disc drive 120 is to convert these LBAs into a physical address on the disc. The physical address is defined by cylinder, head and sector. A cylinder is the radial position defined by a vertically aligned group of data tracks and a corresponding servo track. Selecting a head defines which of the data tracks in the cylinder will be accessed, and the sector defines the circumferential position on the track where the block of data to be transferred begins. Once the system microprocessor 134 has translated the LBA to a physical address, the seek to that address is initiated by a command passed to the servo microprocessor 96 on the command path 112 in FIG. 6. This command includes a physical address which the servo microprocessor 96 compares with the current position of the actuator derived from the servo data decode logic 94.

If the physical address requested by the system microprocessor 134 differs from the current cylinder, the servo microprocessor 134 initiates a seek to the desired cylinder and reports the completion of the seek to the system microprocessor 134 by way of an inter-processor status bus 136.

Once the seek is completed, the system microprocessor 134 then selects the direction for data transfer based on the command received on the host interface 122. That is, if data is to be written onto the disc, the data received over the data bus 126 is passed to a data buffer 138 and then serially written to a disc 140 by way of an internal data bus 142. Completion of the transfer is signified to the host computer system 124 by way of the status bus 132 in the host interface 122. Conversely, if data is to be retrieved from the disc 140, it is serially read from the disc 140 via the internal data bus 142 into the data buffer 138. Notification of the availability of the data in the data buffer is sent to the host computer system 124 via the status bus 132 and the data is then transferred to the host computer system via the data bus 126.

Figure 5:
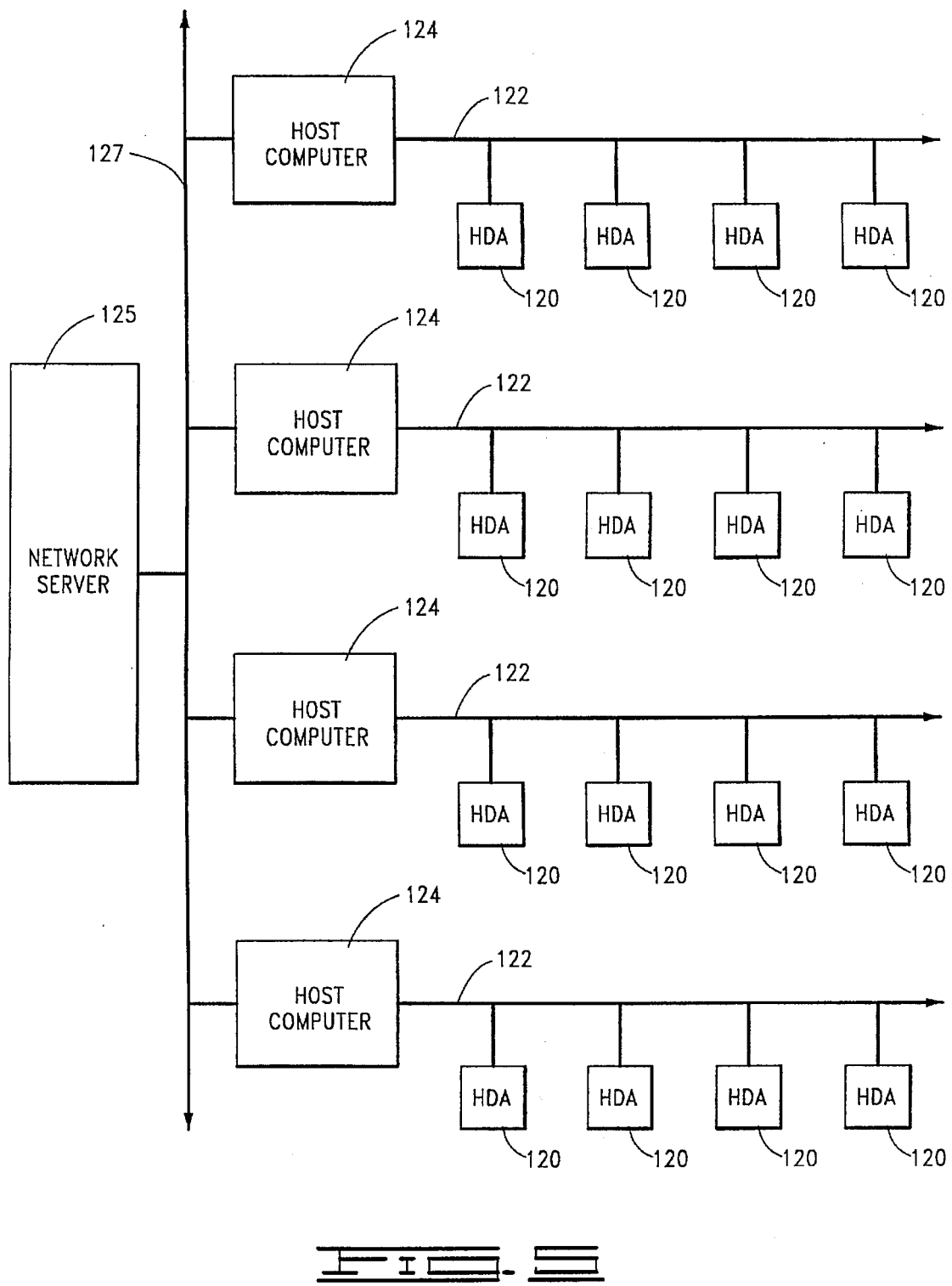
FIG. 5 is a block diagram of a typical high volume test system used during the manufacture of disc drives and capable of performing the method of the present invention.
Figure 5:
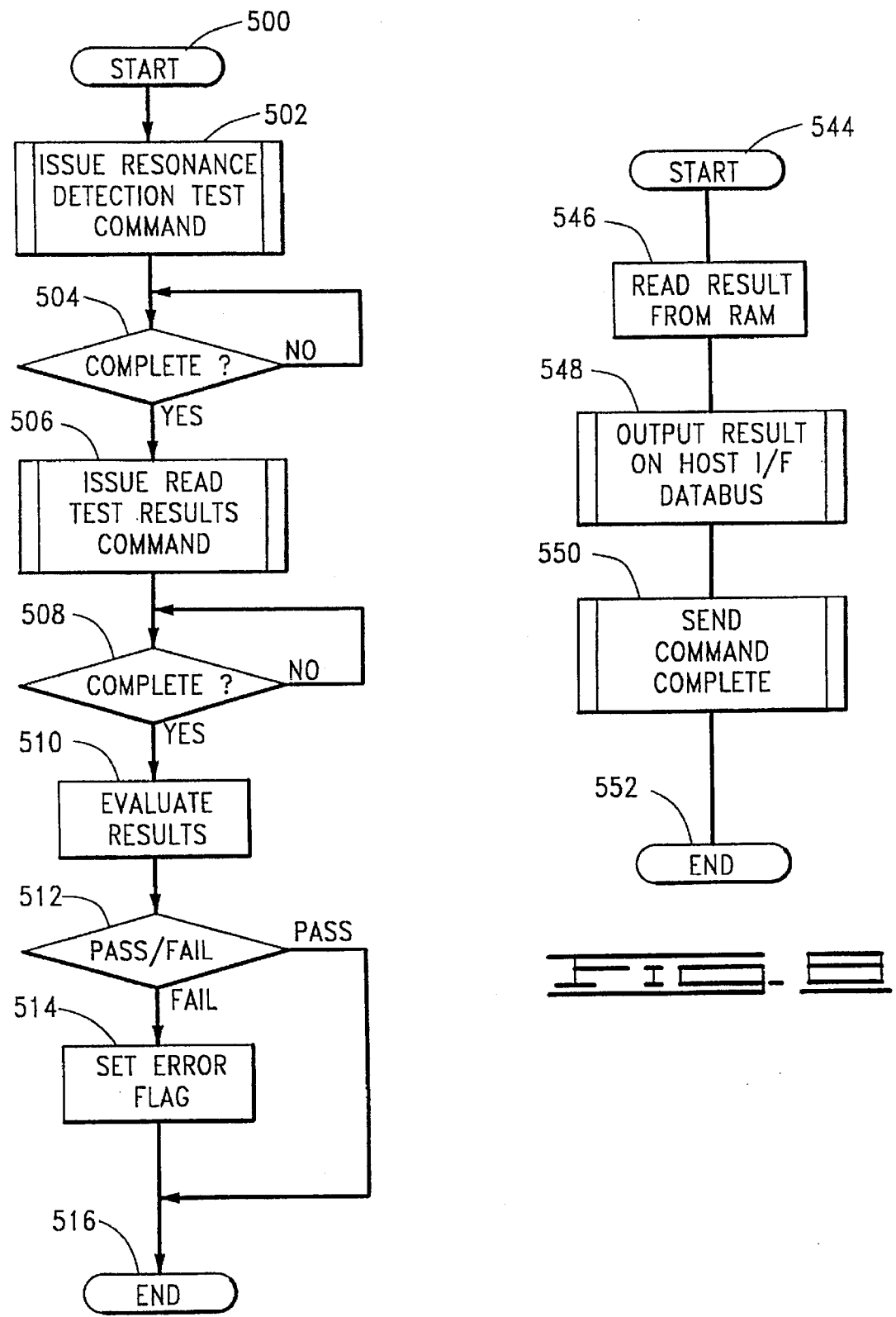

Turning now to FIG. 5, shown is a block diagram of a typical high volume test system which can be used in the manufacture of disc drives such as those described hereinabove, and which is capable of performing the method of the present invention. The test system includes a plurality of host computer systems 124, typically commonly available personal computers or PCs, connected to each other and a network server 125 via a network bus 127. As is readily seen, each of the host computer systems 124 is connected via its host interface 122 to a plurality of disc drives 120 to be tested. In such a system, the network server 127 typically keeps track of overall system operations, such as throughput statistics, failure rates, etc., and would be especially useful in providing automated test performance information regarding the results of the test of the present invention. Control of specific testing tasks, however, lies within the host computer systems 124. Implementation of specific actions necessary to the performance of the testing tasks is carried out by the interaction of the host computer system 124, system microprocessor and the servo microprocessor, as will be described in detail hereinbelow.

It will also be apparent from FIG. 5 that, in a high volume manufacturing environment, it would not be economically feasible to provide a frequency analyzer costing thousands of dollars each to attach to each of the disc drives being tested. Similarly, it would be extremely inefficient from the point of view of time utilization to provide for a lesser number of frequency analyzers (for instance one per host computer system) and have the operator of the test system connect the frequency analyzer in turn to each individual drive, perform the necessary tests and disconnect the frequency analyzer and move it to the next unit to be tested.

Before continuing with a detailed description of the invention, it should be recalled that the present invention relies on an empirically derived correlation between certain specific mechanical defects in the disc drive and a susceptibility of the disc drive to resonance at a marker frequency. That is, over the history of manufacturing hundreds of thousands—and even millions—of identical disc drive units, a correspondence has been noted between drives with a specific mechanical fault and a tendency for those drives to resonate at a specific frequency. For instance, it has been determined that disc drive units of one design having a particular type of tilt between the actuator and the discs have also found to be particularly susceptible to vibrations at approximately 1.1 kHz. Since this particular mechanical fault was also associated with early failure of the disc drive, it was advantageous to be able to screen for the mechanical fault by testing for resonance at the associated marker frequency. In this manner, the mechanical fault could be identified without the necessity of opening the sealed head/ disc assembly and performing a detailed mechanical analysis. Further, it was found that other mechanical defects were reflected in the disc drives' susceptibility to resonance at other specific marker frequencies, and this relationship between mechanical defect and resonant frequency susceptibility forms the foundation on which the present invention is based.

It is well known in the industry that if a large amount of current is suddenly applied to the coil of an actuator voice coil motor, a broad spectrum of vibrations will be excited in the disc drive structure. Historically, such excitation of the disc drive structure was known to induce sympathetic vibrations in the disc drive housing and the generation of undesirable acoustic noise. Thus, it was thought that the abrupt application of current to the coil of the voice coil motor was something to be avoided, and much effort was directed to the prevention of such excitation of the disc drive structure. See, for instance, U.S. patent application Ser. No. 676,787 filed Mar. 28, 1991 now U.S. Pat. No. 5,475,545, by Hampshire et al., entitled METHOD FOR REDUCING NOISE DURING SEEKS IN A HARD DISC DRIVE; and U.S. patent application Ser. No. 923,779 filed Jul. 31, 1992 by McKenzie entitled METHOD FOR REDUCING NOISE DURING TRACK SEEKING IN A DISC DRIVE. Each of these patent applications is assigned to the assignee of the present invention; further, each of these is incorporated herein by reference.

The present invention takes advantage of this known phenomenon to provide intentional excitation of the disc drive structure, after which testing for resonance at known marker frequencies can be accomplished. That is, during the test operation, special test seeks are performed which include the abrupt application of acceleration and deceleration current to the coil of the actuator motor. The seek length is selected such that any induced vibration in the disc drive structure will be reflected in the servo loop once the actuator has entered into track following mode at the destination track. Since the marker frequencies differ from mechanical defect to mechanical defect, and since the same defect may be reflected in resonance at differing frequencies in different disc drive designs, it may also be necessary to select various attributes of the test seek, such as seek length, seek direction and starting track for the seek, to ensure that the test seek excites the disc drive structure at the frequency to be tested. Such selection can be empirically derived, by attempting seeks having differing characteristics in disc drives known to have a specific mechanical defect. The seek parameter combination that best serves to excite resonance at the marker frequency is then used by the test program for all drives to be tested.

Turning now to FIG. 6, shown is a general flow diagram of a program executed by the host computer system 124 as shown in FIG. 5, which would cause the system microprocessor 134 in the disc drive 120 to perform the steps necessary to implement the method of the invention. It should be recalled that the overall operation of the invention requires linked communication between the host computer system and the system microprocessor in the disc drive, as well as linked communication between the disc drive system microprocessor and the disc drive servo microprocessor. That is, a system level command from the host computer system causes the disc drive system microprocessor to interpret the system level command and pass on to the disc drive servo microprocessor a second set of instructions to which the servo microprocessor responds by executing a specific sequence of physical steps and actions.

The flow diagram of FIG. 6 would be a small portion of the overall test sequence performed on disc drives during the manufacturing test operation. Since the present invention relates to the detection of mechanical defects in the disc drive, it would be logical if this test were performed before certain other long-running tests, such as electronic burn-in, thermal cycling, etc. In this way, early detection of the mechanical defects saves the time and resources needed for the long-term test operations.

When during the course of manufacturing the time comes to perform the method of the present invention, the host program enters its calling routine at the start point 500. The host computer system (124 in FIGS. 4 and 5) then issues a RESONANCE DETECTION TEST command via the host interface (122 in FIGS. 4 and 5) at step 502 and enters a loop at step 504 waiting for the disc drive (120 in FIGS. 4 and 5) to respond with a command complete via the status bus (132 in FIG. 4) which is a portion of the host interface 122. The actions initiated in the disc drive by the RESONANCE DETECTION TEST command will be described in detail below.

Once the host computer system 124 receives the command complete status from the disc drive for the RESONANCE DETECTION TEST command, the host computer system 124 drops out of the loop of step 504 and issues a READ TEST RESULTS command, again on the host interface 122, at step 506, and enters a second loop at step 508 waiting for the disc drive to indicate the completion of the READ TEST RESULTS command by passing the command complete status in the same manner noted above. This READ TEST RESULTS command causes the disc drive to read the results of the completed resonance test from an internal memory location and pass the results to the host computer system via the data bus (126 in FIG. 4) which also forms a part of the host interface 122. Once the command complete status is sent to the host computer system, the host computer system reads the data forming the result of the resonance detection test from the data bus 126 and stores this data in a memory location internal to the host computer system. The actions initiated in the disc drive by the READ TEST RESULTS command will be described in detail below.

Step 510 of the flow diagram of FIG. 6 is a very general step during which the host computer system evaluates the results obtained in step 506. The actual evaluation that occurs can vary greatly based on the specific resonance frequency being tested for in the disc drive, and the associated mechanical defect that the presence of resonance at the frequency represents. In general, though, such an evaluation could comprise the comparison of the numerical test result data to a pre-defined threshold value, and the establishment of a pass\fail criteria based on this comparison.

The evaluation of step 510 is followed in the host computer system by a pass\fail decision at step 512. If the evaluation of step 510 produced a "Fail" condition, the flow of FIG. 6 continues to step 514, where an error flag is set. The setting of this error flag could in turn lead to several actions which are in and of themselves not a part of the present invention. For instance, the setting of the error flag could result in the triggering of an audible alarm alerting the operator of the test system that one of the disc drives under test has failed. This in turn would be cause for the operator to take whatever steps are necessary to identify the specific failing disc drive, remove it from the test system, and replace it with another disc drive to be tested. The failed disc drive could then be sent to another location for either teardown and repair, reassembly, remanufacture or scrapping, whatever the manufacturer has determined to be the proper consequence of failure of the test. Further, the test results obtained in step 510 could be collected along with other diagnostic information and transferred along with the failed disc drive unit as an aid to reworking.

If, however, the evaluation of step 510 indicates a "Pass" condition, the flow of the program shown in FIG. 6 ends at step 516, which passes control of the host computer system to the next test in the manufacturing process.

FIG. 7 is a flow chart of the program executed by the system microprocessor (134 in FIG. 4) in response to the receipt of the RESONANCE DETECTION TEST command from the host computer system (124 in FIG. 4) as previously discussed in relation to step 502 of the flow of FIG. 6. Once the system microprocessor has decoded the RESONANCE DETECTION TEST command, it enters the flow of FIG. 7 at the START step 518. The next step 520 in the sequence sets up the necessary parameters for a normal seek of the actuator to a start track. As mentioned previously, using the actuator mechanism itself as an excitation source may include the predetermination of a specific seek to optimize the excitation of the disc drive structure at the marker frequency being tested. This optimization may include the necessity of starting the test seek operation at a particular track, and this step and the step to follow are included in the flow to allow for this possibility. The system micro processor then issues a SEEK command to the servo microprocessor at step 522. The SEEK command is transferred to the servo microprocessor via the interprocessor command bus (112 in FIG. 5). The actions initiated in the servo microprocessor in response to the receipt of the SEEK command will be described in detail below.

Returning now to the flow chart of FIG. 7, after the system microprocessor sends the SEEK command, the program flow enters a decision block 524 checking for errors encountered in the execution of the SEEK command. As the flow illustrates, if an error is encountered, an error flag is set at step 526 and the flow for the system microprocessor program terminates at step 528. Setting the error flag, however, will also cause an error condition to be reported back to the host computer system which, it should be recalled, initiated this SEEK command as a part of its own RESONANCE DETECTION TEST command.

If, however, no errors are detected in the performance of the SEEK command, the flow of the system microprocessor program of FIG. 7 continues at step 530, which sets up the parameters for the TEST SEEK command to follow. It should be noted that this TEST SEEK operation is being used to cause excitation of the disc drive structure, so there will be no exponential "softening" of the application of current to the actuator as is done in the normal fast seek operation. The specific parameters being initialized in step 530 will also include a destination track address, which will in turn determine the length of the TEST SEEK. The TEST SEEK must be long enough to excite the disc drive structure as desired, and yet short enough to allow for the testing of resonance before the induced vibrations are damped out. For instance, it has been found that the resonance associated with actuator tilt mentioned previously can be induced and tested for if the TEST SEEK is approximately fifty tracks in length.

After the TEST SEEK command is issued in step 532, the system microprocessor enters a decision box 534 where the system microprocessor checks for any error conditions which might have occurred in the servo microprocessor's execution of the system microprocessor's TEST SEEK command. As explained above, any error is flagged at step 526 which results in the error condition being passed on to the host computer system.

If no errors are detected in the TEST SEEK operation, the flow chart of FIG. 7 continues at step 536 wherein the system microprocessor issues a READ TEST SEEK RESULT command to the servo microprocessor. Specific details of the actions of the servo microprocessor in response to the receipt of the READ TEST SEEK RESULT command will be discussed in detail below. For purposes of discussion of the system microprocessor operation, it is sufficient to note that the system microprocessor again checks for errors at step 538 and obtains the result of the test operation from the servo microprocessor via the interprocessor data bus (shown as bus 135 in FIG. 4) upon receipt from the servo microprocessor of a COMMAND COMPLETE status.

Once the system microprocessor has received the result of the test operation, it stores the result in its own internal RAM (133 in FIG. 4) at step 540 and notifies the host computer system that the command is completed and the test results are available by sending a COMMAND COMPLETE to the host computer system at step 542 via the host interface status bus (132 in FIG. 4).

The system microprocessor flow then ends at step 528 where control of the system microprocessor is returned to a routine awaiting another command on the host interface command bus (130 in FIG. 4).

It should be noted that a single RESONANCE DETECTION TEST command from the host computer system (step 502 of FIG. 6) initiated the entire course of action shown in the flow diagram of FIG. 7, which in turn includes the interaction of three commands between the system microprocessor and the servo microprocessor.

FIG. 8 shows a flow diagram of the actions initiated in the system microprocessor when the host computer system issues the READ TEST RESULTS command (FIG. 6, step 506). After the system microprocessor has decoded and recognized the READ TEST RESULTS command, program flow passes to the flow diagram of FIG. 8 at START step 544. The system microprocessor, which received the test results from the servo microprocessor in step 540 of FIG. 7, then reads the test results out from its internal RAM at step 546, outputs the result onto the host interface data bus at step 548 and sends a COMMAND COMPLETE status to the host computer system via the host interface status bus at step 550. The operation requested by the host computer system being completed, the program flow for this system microprocessor then ends at step 552.

Figure 9:
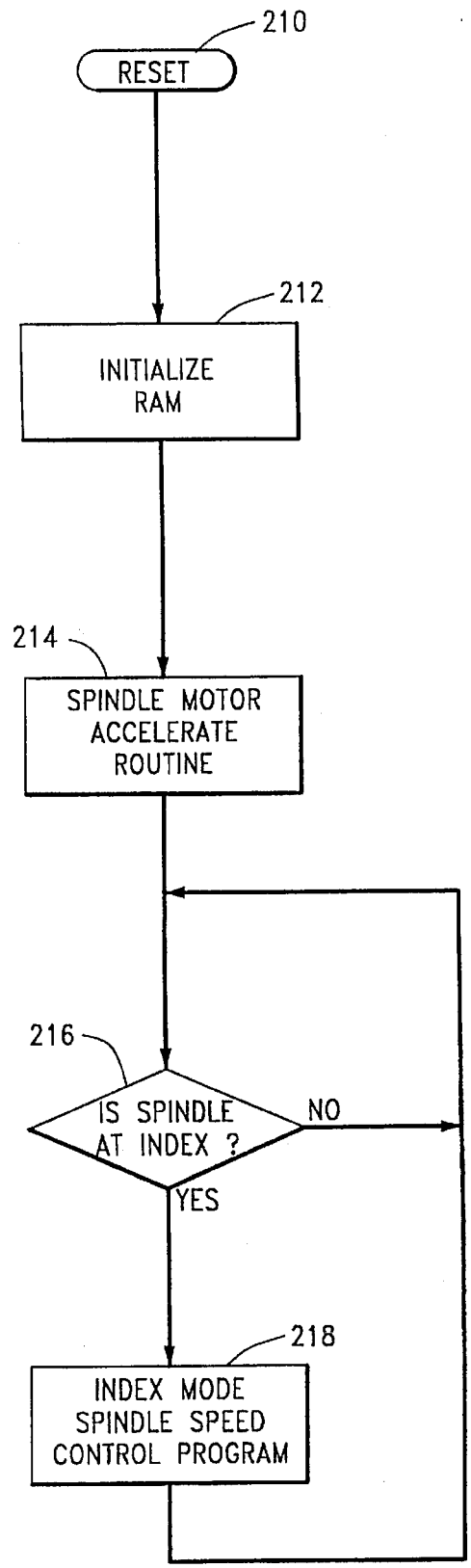
FIG. 9 is a flow diagram of the main microprogram executed by the servo microprocessor of the servo system of FIG. 2.

The clearest way of showing the interrelationship between the operation of the system microprocessor 134 (as shown in FIG. 4) and the servo microprocessor 96 is through the use of flow charts. FIG. 9 provides a simplified flow chaff of the main program executed by the servo microprocessor 96. The servo microprocessor 96 is reset at power on in step 210, initializing the hardware and setting it to a desired known condition. The servo microprocessor RAM 98 is initialized at step 212, and the servo microprocessor 96 then enters a routine to accelerate the spindle motor from rest to its specified operating speed in step 214. Once the spindle motor has reached its nominal operating speed, the servo microprocessor 96 enters a simple loop program checking for the index signal to be decoded by the servo data decode logic 94 in decision block 216, and when index has been detected, running an index mode spindle speed control program at step 218 to maintain the spindle motor at the desired speed. All other operations of the servo microprocessor are accomplished through the use of interrupts to the servo microprocessor 96.

Figure 10A:
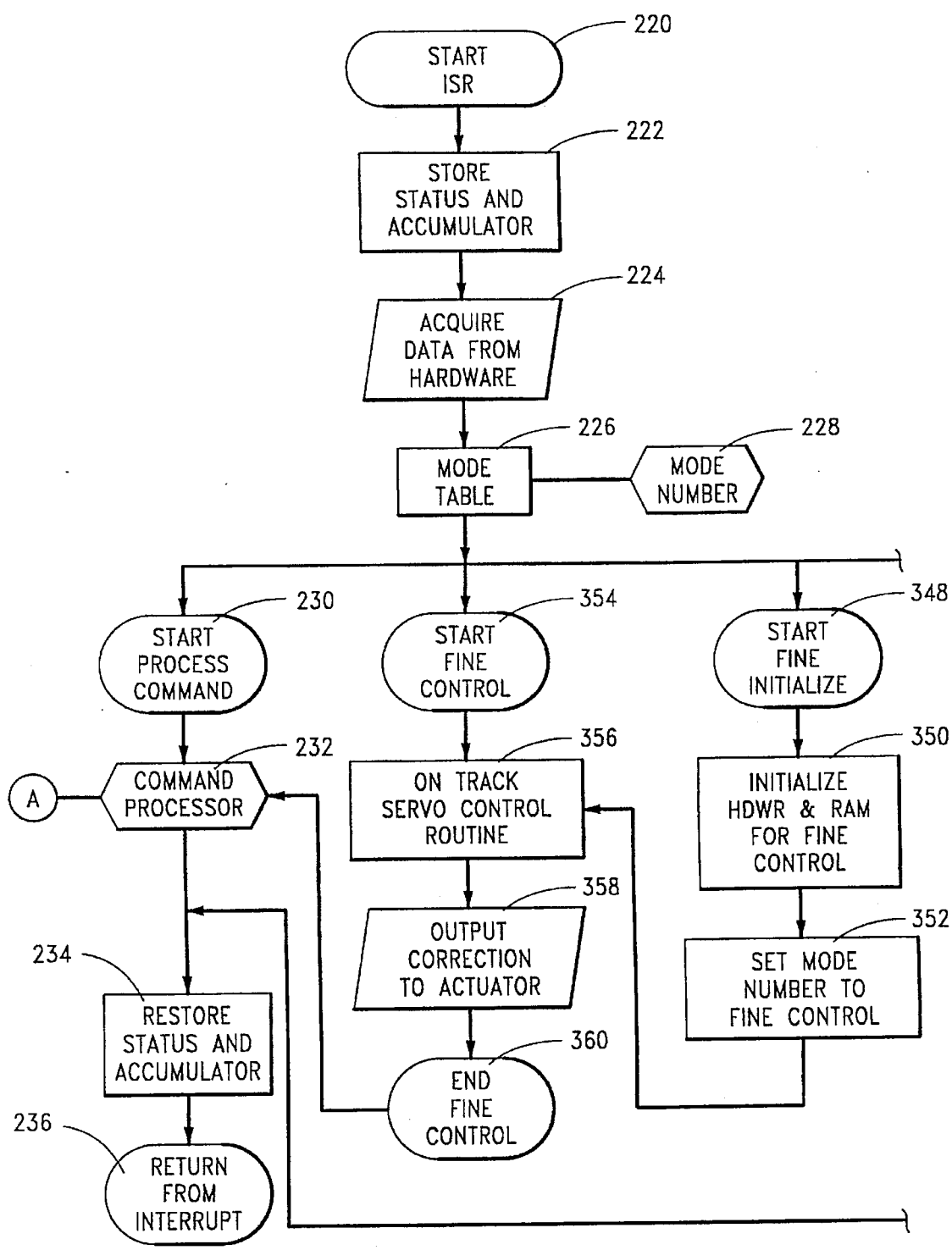
Figure 10C:
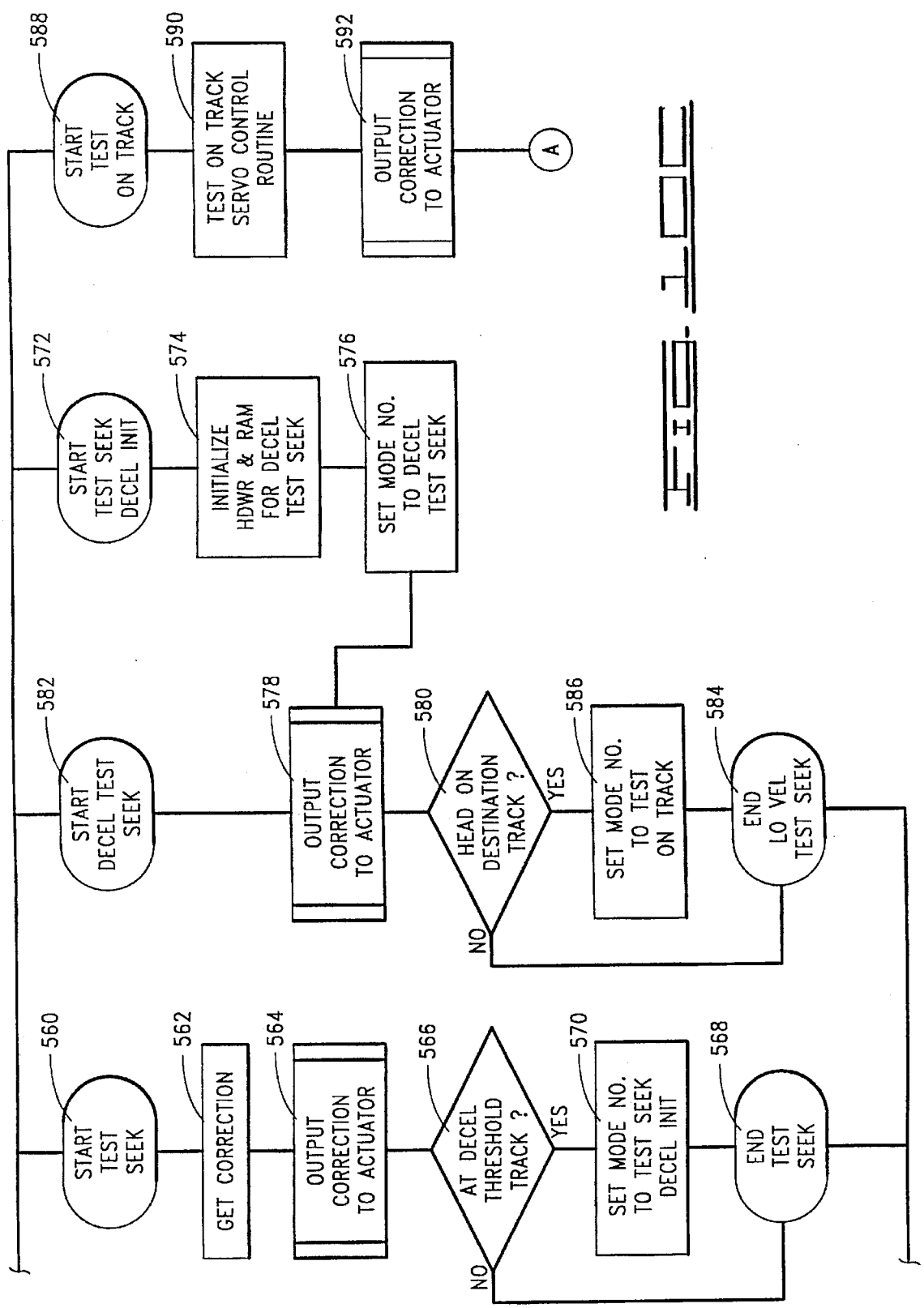

FIGS. 10A, 10B and 10C show a portion of the main interrupt service routine (ISR) for the servo microprocessor 96. It will be understood that this is not a comprehensive flow chart for all functions performed by the servo microprocessor 96, but it does summarize the functions that the servo microprocessor 96 performs in the steps of the present invention. It should be recalled that interrupts are sent to the servo microprocessor 96 on a constantly recurring basis, once the spindle motor has reached operating speed, as a function of the servo loop 90 (as described hereinabove with reference to FIGS. 2 and 4). Specific generation of the interrupts and the timing used for this generation is explained in detail in the previously incorporated U.S. Pat. No. 5,262,907. For purposes of this discussion, however, it is sufficient to note that an interrupt is sent to the servo microprocessor 96 once for each servo frame 102 (as shown in FIG. 3), at a time after the address, position, and sector fields have been decoded by the servo data decode logic 94. This results, in the specific application of the incorporated reference U.S. Pat. No. 5,262,907, in an interrupt occurring about every 42 microseconds.

Referring now to FIG. 10A, the interrupt service routine executed by the servo processor starts at a block numbered 220. The servo microprocessor 96 contains an accumulator which is the working register for mathematical and logical operations and a status register which defines several internal conditions for the program being executed. Because the servo microprocessor 96 does not automatically store the accumulator and status register in response to an interrupt, the accumulator and status registers are saved as a first step 222 in the ISR. Next, several different types of information, such as the track address, actuator drive current, servo position error (SPE), presence of index, etc. are collected from the servo system and stored away in the servo microprocessor RAM at step 224. At this time, the specific interrupt to be serviced has not been identified and it is faster to simply store this information for every interrupt than to determine the reason for the interrupt and then collect the data necessary to service the interrupt. The ISR then selects the starting address of the proper service routine from a mode table at step 226, based on a mode number supplied by the block 228. This mode number may be determined by the previously executed interrupt routine, or preset at power up. Assuming that this is the first interrupt after power application, the mode number points to the element of the mode table that supplies the starting address of the routine identified as "START PROCESS COMMAND" at block 230. This routine again involves a number of choices at block 232 the "COMMAND PROCESSOR", but before examining these choices, it should be noted that the flow diagram indicates that no matter what actions the COMMAND PROCESSOR initiates, the ISR returns to this point to finish servicing the interrupt, as do all other routines selected by the look up of the mode table at step 226. As FIG. 10A shows, the final steps in servicing all interrupts involves restoring the status register and accumulator at step 234 and exiting to the previously interrupted program at step 236.

Figure 11A:
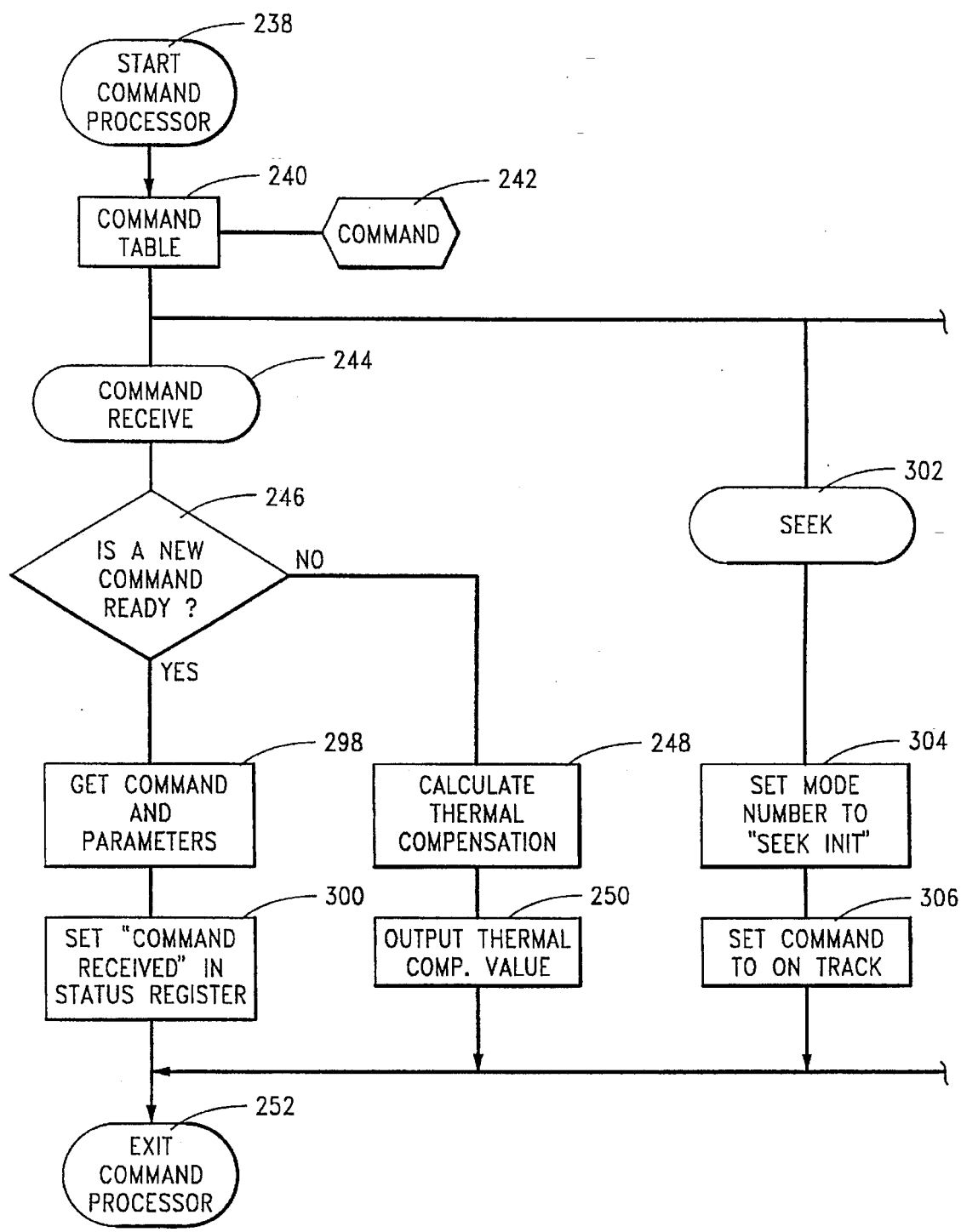
FIGS. 11A–11C are flow diagrams of a second level portion of the interrupt service routine executed by the servo microprocessor of the servo system of FIGS. 2 and 4.
Figure 11:
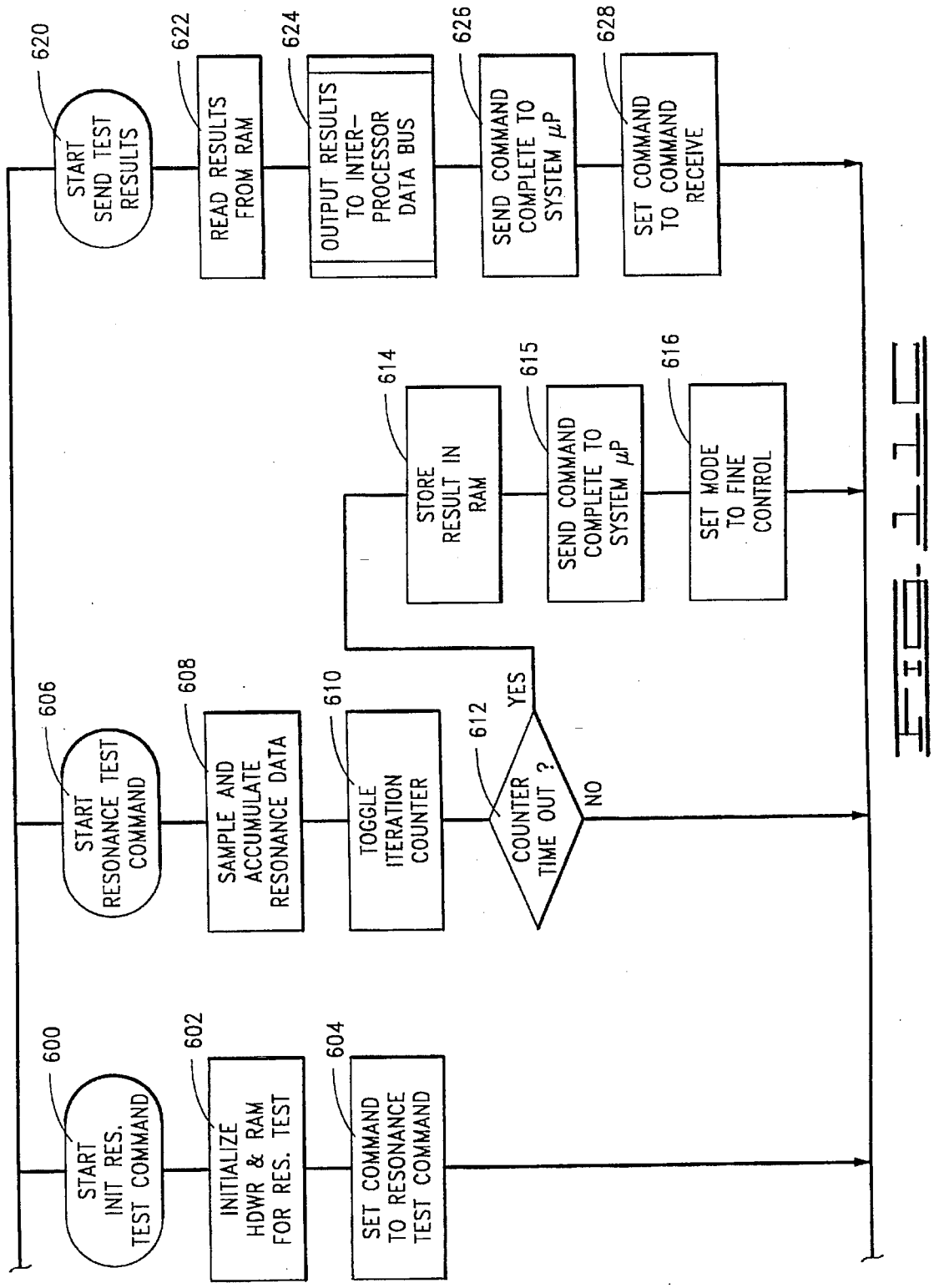

The operation of the COMMAND PROCESSOR is shown in the flow diagram of FIGS. 11A, 11B and 11C. FIGS. 11A–11C are only a partial flowchart of all the options that may be executed by the COMMAND PROCESSOR, but includes the choices necessary to define the present invention. The flow chaff begins at step 238, and the subsequent path for the interrupt service is determined by selecting a starting address for the next program to be executed from a COMMAND TABLE at step 240. The specific address to be selected is determined by the COMMAND block 242. Once again, the COMMAND may be selected by a previously executed Command Process, or preset to a default value at power on. Once again, assuming that this is the first interrupt after power on, the COMMAND block 242 selects the staffing address of the COMMAND RECEIVE routine which begins at block 244 from the COMMAND TABLE 240. The COMMAND RECEIVE routine first checks to see if a command has been received from the system microprocessor 134 (FIG. 4) at step 246. If no such command has been received, the servo microprocessor calculates a thermal compensation factor at step 248, transfers this compensation factor to the portion of the microprogram which controls actuator drive current at step 250 and exits the COMMAND PROCESSOR flow at step 252. It should be recalled that this exit returns program flow to step 234 of FIG. 10A, where the status register and accumulator are restored and the ISR is terminated at step 236. This path, steps 220 through 232, 238 through 252, and 234 to 236, interrupt servicing continues to be selected for each interrupt until a command is received by the servo microprocessor 96 from the system microprocessor 134.

The present invention can perhaps be best understood by following the servo processor flows as they would by called by the system processor flows discussed above in relation to FIGS. 7 and 8. Returning briefly to FIG. 7, it can be seen that the first command issued by the system microprocessor to the servo microprocessor is the SEEK command at step 522. It will be recalled that this is a normal seek to put the actuator at a desired track from which the special TEST SEEK can begin.

As shown in FIG. 11A, when the system processor instructs the system to perform a seek, the seek command and target track are read by the servo microprocessor at step 298 and a "command received" bit is set at step 300 in the status register of the servo microprocessor of the receipt of the command. Because at the termination of the previous interprocessor action, the flow diagram of FIG. 10A was left in the FINE CONTROL mode, at the next interrupt, the COMMAND PROCESSOR is again called at step 232, but the decoding of the SEEK command at 242 selects the starting address of the SEEK command routine from the COMMAND TABLE 240, which passes program control to the SEEK routine at step 302 of FIG. 11A. At step 304, MODE selection for "SEEK INIT" is sent to the mode number selection (step 228 in FIG. 10A) to set up for the next interrupt. Step 306 sets up the command selection 242 to select "ON TRACK" as the next path through the COMMAND PROCESSOR.

On the next interrupt, the ISR of FIGS. 10A, 10B and 10C is entered at step 220, the accumulator and status registers are stored at step 222 and the current hardware parameters are collected at step 224. On this pass through the ISR, however, the mode number selection of block 228 has been set up to select the starting address of the SEEK INIT routine from the MODE TABLE in block 226, which begins the SEEK INITIALIZE routine at step 308 of FIG. 10B. In step 310, the destination address passed to the servo microprocessor with the seek command is read into the working logic of the servo microprocessor. Steps 312 and 314 initialize the internal hardware, RAM and Mode selection to begin the desired type of seek at the next interrupt. The available seek types include a LOW VELOCITY SEEK, a HIGH VELOCITY SEEK, and a TEST SEEK. The LOW VELOCITY and HIGH VELOCITY SEEKs are used during normal disc drive operation, and the selection of one of these normal seeks is based on the difference between the current head location, obtained in step 224 of FIG. 10A, and the destination track read in step 310. If the difference is greater than four tracks, a HIGH VELOCITY SEEK is selected; otherwise, a LOW VELOCITY SEEK is selected. A TEST SEEK, of course, would be selected in order to evaluate the aforementioned resonant frequency response of the disc drive and would not normally be selected during normal disc drive operation, but rather during evaluation of the drive, such as during manufacturing test. Regardless of the seek type selected, the SEEK INITIALIZE routine is then ended at step 316 and the servo microprocessor returns to the loop program of steps 216 and 218 of FIG. 9, awaiting the next interrupt.

Assuming that the desired seek is of the normal variety, so that the seek is to be performed during normal disc drive operation, and further assuming that the heads at the time of such seek were more than four tracks from the desired destination track, the next pass through the ISR selects the starting address of the HI VEL SEEK routine from the MODE TABLE 226 of FIG. 10A, and the HI VEL SEEK routine begins at step 318 of FIG. 10B. The HI VELOCITY SEEK SERVO CONTROL routine is shown as a single block 320. Details of the routine can be found in the previously incorporated U.S. Pat. No. 5,262,907, but for this discussion, it is sufficient to note that the actuator is accelerated toward the destination track in accordance with a stored acceleration and deceleration profile. Acceleration continues until a maximum velocity is attained or until the heads approach the destination closely enough to begin decelerating. The calculated servo correction value is sent to the actuator coil in step 322. Decision block 324 examines the servo seek parameters looking for a specific deceleration threshold velocity. As long as the HI VELOCITY SEEK SERVO CONTROL routine is accelerating the actuator, and the head reaches a deceleration threshold track, decision block 324 simply ends the HI VEL SEEK service routine at step 326. Subsequent interrupts will continue to select the HI VEL SEEK routine starting at step 318 until the heads approach the destination track and the threshold deceleration track is reached, at which time the decision block 324 passes program control to step 328, where the mode selection is set up to select the LO VEL SEEK INIT mode on the next pass through the ISR.

LO VEL SEEK INIT is started at step 330 of FIG. 10B. At step 332, internal hardware and RAM are initialized for the low velocity seek mode (LO VEL SEEK), and step 334 sets up mode selection to select the LO VEL SEEK routine on the next interrupt. The LOW VELOCITY SEEK SERVO CONTROL routine is then entered at steps 336, continuing the deceleration of the heads to rest on the destination track. The correction value for the actuator coil is then sent to the actuator in step 338, and a check is made in decision block 340 to see if the heads are on the destination track. If not, the LOW VEL SEEK routine is ended at step 342, and subsequent interrupts will select the LO VEL SEEK routine starting at step 344, continuing through steps 336 and 342, until the heads arrive on the destination track. At that time, decision block 340 passes program control to step 346, where mode selection is set up to select FINE INITIALIZE mode during servicing of the next interrupt.

The FINE INITIALIZE mode, consisting of steps 348, 350 and 352 of FIG. 10A, sets up the hardware, RAM and mode selection to select the FINE CONTROL mode during subsequent interrupt services. The FINE CONTROL mode is also referred to as the Track Following mode, and is used to maintain the heads centered on the desired track. The FINE CONTROL mode, consisting of steps 354, 356 and 358, executes the ON TRACK SERVO CONTROL routine, outputs necessary correction values to the VCM control circuitry 100 and ends at step 360 by calling the COMMAND PROCESSOR. As long as the disc drive is sitting on-track in track following mode, all interrupt services run through the FINE CONTROL routine and call the COMMAND PROCESSOR.

Turning once again to FIGS. 11A, 11B and 11C, it should be recalled that on the last pass through the COMMAND PROCESSOR before the seek was begun, the command selection was set up to select the ON TRACK routine at step 306 of the SEEK routine. On the first pass through the COMMAND PROCESSOR after the FINE INITIALIZE routine on FIG. 10A, the COMMAND PROCESSOR thus selects the ON TRACK routine starting at step 362 of FIG. 11B. At step 364 the velocity and position of the actuator is checked and, at decision block 366, the results of the measurements of step 364 are checked to determine if the heads are centered on the destination track. Until the heads do arrive at track center, this loop, steps 354 through 366, is repeated for each interrupt service. Once the heads are centered on the track, decision block 366 passes program control to step 368, where the command number selection 242 of FIG. 11A is set up to select the CHECK TRACK routine on the subsequent pass through the COMMAND PROCESSOR. The CHECK TRACK routine, starting at step 370 of FIG. 11B, checks at step 372 to see if the heads are centered on the correct track. If not, a "RESEEK INIT" is initiated at step 374. Since the "RESEEK INIT" is not germane to the concept of the present invention, it will not be discussed further herein. Instead, it will be assumed that the seek did result in the heads being centered on the destination track, and that program flow continues at decision block 373, where the initial SEEK TYPE (determined at step 312 of the SEEK INITIALIZE flow of FIG. 10B) is checked and, if this is not a special TEST SEEK (in accordance with the present invention) then the flow continues to step 376, where the command selection is set up to the COMMAND RECEIVE routine for the next pass through the COMMAND PROCESSOR to await the next command from the system microprocessor. At step 378, the COMMAND COMPLETE bit is set in the status register, to let the system microprocessor know that the requested seek has been successfully completed. Subsequent interrupts cause the servo microprocessor to follow the flow path through the FINE CONTROL routine (steps 354 through 360 on FIG. 10A) and the COMMAND RECEIVE routine through the COMMAND PROCESSOR flows (steps 244 through 252 on FIG. 11A) until another command is received from the system microprocessor at step 246.

Returning now to FIG. 7, it will be recalled that the sequence just described was executed by the servo microprocessor in response to its receipt from the system microprocessor of the SEEK command at step 522. Assuming that there was no error encountered during the execution of this SEEK, the system microprocessor flow of FIG. 7 passes through the ERROR decision box at step 524 and continues at step 530, wherein the system microprocessor sets up the parameters that will be needed by the servo microprocessor to perform the special TEST SEEK which is a part of the present invention. It should be recalled that the particular parameters which will be passed to the servo microprocessor are dependent on the system level RESONANCE DETECTION TEST command passed to the system microprocessor at step 502 of the host computer system flow diagram of FIG. 6, and will vary depending upon the particular frequency being tested for resonance in the disc drive.

The specific parameters which could be determined by the particular test to be executed could well include such variables as the seek length and mathematical variables which will be used by the servo microprocessor to screen for resonances at a particular frequency. Once these parameters have been established, the system microprocessor flow continues at step 532, where the system microprocessor issues the TEST SEEK command.

Returning now to the servo microprocessor flows of FIGS. 10A through 10C, it will be recalled that at the completion of the previous normal seek, the mode control left the servo microprocessor cycling through the FINE CONTROL mode path (steps 354 through 360) and, from there, through the COMMAND PROCESSOR. In FIGS. 11A through 11C, the COMMAND PROCESSOR was previously left in the COMMAND RECEIVE mode, checking for new commands at step 246 and calculating and outputting thermal compensation values in steps 248 and 250.

When the TEST SEEK command is received by the servo microprocessor, the COMMAND RECEIVE flow of FIG. 11A enters the decision box 246, and because a new command has been received, passes program control to step 298 where the command is decoded and the parameters sent by the system microprocessor with the command are collected. At step 300, the COMMAND RECEIVED status is returned to the system microprocessor, and the COMMAND PROCESSOR is exited at step 252.

Upon receipt of the next interrupt the servo microprocessor enters the ISR of FIG. 10A and once more flows through the FINE CONTROL mode to the COMMAND PROCESSOR at step 232. In FIG. 11A, at this time the COMMAND PROCESSOR has decoded the TEST SEEK command from the command box 242 and selected the starting address of the SEEK command from the command table 240, passing control to step 302. In step 304, the mode number is set to SEEK INIT, the command is set to ON TRACK at step 306, and the COMMAND PROCESSOR is exited at step 252.

At the next interrupt, the mode number selection logic at step 228 of FIG. 10A has been set to select the starting address of the SEEK INIT routine from the mode table 226 and process flow continues at step 308 of FIG. 10B, START SEEK INITIALIZE.

Because the test seek is similar to a normal seek, the same initialize flow is executed for both seek types. In the SEEK INITIALIZE flow, at step 310, the destination track address is obtained from the command register (step 298 of FIG. 11A) and the flow continues at step 312 where the hardware and RAM are initialized for the desired seek type, in this case, the TEST SEEK. In step 314, the mode number is set to TEST SEEK, and the SEEK INITIALIZE flow terminates at step 316.

At the next interrupt, the mode number control logic 228 on FIG. 10A selects the starting address of the START TEST SEEK flow from the mode table 226 and program control passes to step 560 on FIG. 10C. The first action taken in the START TEST SEEK FLOW occurs at step 562, wherein a fixed correction value is retrieved from servo microprocessor RAM (item 98 in FIG. 4). This fixed correction value is selected such that a maximum acceleration current value will be applied to the actuator coil, resulting in abrupt acceleration of the actuator and broad spectrum excitation of the disc drive structure. As previously mentioned hereinabove, this correction value will not generally include the normal tailoring of the applied acceleration current that is used during normal seeks in order to suppress acoustic noise in the user environment.

At step 564, this correction value is output to the actuator via the VCM control circuitry (100 as shown in FIG. 4). Of course, it will be recognized that the correction value supplied to the VCM control circuitry 100 will be a digital value, whereas the signal supplied by the VCM control circuitry 100 will be a proportional analog current. Similarly as in a normal seek, servo microprocessor flow continues at decision block 566 where a comparison is made between the current track and a deceleration threshold track. Until the deceleration threshold track is reached, process flow for the TEST SEEK continues to loop through steps 560 through 568. At such time that the deceleration threshold track is reached, the process flow passes from the decision block 566 to step 570, wherein the mode number for the next interrupt is set to starting address of the LO VEL TEST SEEK INIT routine.

On the next interrupt, the TEST SEEK DECEL INIT address is selected from the mode table 226, passing program control to the START TEST SEEK DECEL INIT block 572, as shown in FIG. 10C. At step 574, internal hardware and RAM are initialized for deceleration of the actuator, including the retrieval of the appropriate deceleration correction value from RAM, which will be a maximum deceleration value which will be similar to the maximum acceleration value obtained in step 562, but of the opposite polarity. Once the digital maximum deceleration value is passed to the VCM control circuitry (100 in FIG. 4), a maximum analog DC current is applied to the actuator coil by the VCM control circuitry, once again exciting broad spectrum vibration to the disc drive structure.

At step 576, the mode number select logic is set to select the TEST SEEK DECEL flow on the next interrupt and program control passes to step 578, where the deceleration correction value is passed to the actuator (via the VCM control circuitry 100 in FIG. 4). The program checks to see if the actuator has reached the destination track at step 580, and until the destination track is reached, all subsequent interrupts will cause the servo microprocessor to follow the TEST SEEK DECEL flow beginning at step 582, passing through steps 578 and 580 and terminating at step 584. Once the destination track is reached, program flow passes from the decision block 580 to step 586, where the mode selection logic is instructed to set the mode number to TEST ON TRACK at the next interrupt.

Upon receipt of this next interrupt, the program flow passes to step 588 of FIG. 10C, which is the START TEST ON TRACK block, and then to a TEST ON TRACK SERVO CONTROL routine 590, wherein an actuator correction value is calculated to maintain the actuator on the destination track. A typical on track servo control routine is described in more detail in the hereinabove incorporated reference, U.S. Pat. No. 5,262,907. It is important to note at this time that some type of servo correction routine is necessary in order to keep the actuator from operating in an open loop control condition, while the resonance testing takes place, and this may serve to correct for some resonant frequencies excited by the abrupt acceleration and deceleration resulting from the TEST SEEK operation. However, it will be recognized that such correction capability will be both frequency and amplitude bandwidth limited, so that uncorrected frequencies will still be present in the disc drive structure and reflected in the servo position error (SPE) signal, and such uncorrected resonant frequencies can subsequently be characterized by the present invention.

At step 592 in the program flow of FIG. 10C, the correction value calculated in step 590 is outputted to the actuator coil (via the VCM control circuitry 100 of FIG. 4) and program control passes immediately to the COMMAND PROCESSOR 232 in FIG. 10A (such path indicated by connecting indicators "A"). It will be recalled that the last previous pass through the COMMAND PROCESSOR was initiated by the SEEK command which initiated this entire TEST SEEK sequence, which ended by setting the command to ON TRACK at step 306 in FIG. 11A. Therefore, the next pass through the COMMAND PROCESSOR passes program control to the ON TRACK command flow of FIG. 11B at step 362. During the ON TRACK program flow, the velocity and position of the actuator (as reflected by the SPE) is measured in block 364 and the program determines whether the actuator is on track center in decision block 366. This program flow will continue until such time as the actuator is indeed on track center at the sample time, after which the program control will pass to block 368, where the command is set to CHECK TRACK for the next pass through the command processor. It should be noted that the mode at this time continues through the TEST ON TRACK flow of steps 588 through 592 (of FIG. 10C) and, thus, is continuously looping through the COMMAND PROCESSOR (FIGS. 11A through 11C). At the next interrupt, when the COMMAND PROCESSOR is entered, the CHECK TRACK flow is selected by the COMMAND PROCESSOR beginning at step 370 of FIG. 11B. The program first checks to determine if the actuator has placed the heads on the correct track at decision block 372; if not, a reseek is initialized at step 374. Assuming that the correct track has been selected, program control proceeds to decision block 373, wherein the program determines whether the current seek is a normal seek or a test seek. Because this is a test seek in the present example, program control passes to block 375, which sets the command to INIT RES TEST for the next interrupt.

Upon receipt of the next interrupt, and the next pass through the COMMAND PROCESSOR (brought about by the TEST ON TRACK mode flow of FIG. 10C), the COMMAND PROCESSOR selects the starting address of the INIT RES TEST flow at step 600 of FIG. 11C. Next, at step 602, the hardware and RAM is initialized in order to perform the resonance test of the present invention. This initialization includes the setting of an iteration counter and the selection of the particular frequency-dependent variables for the resonance test, the operation of which will be described hereinbelow. The servo microprocessor continues to operate at step 604, wherein the COMMAND PROCESSOR logic is set to select the starting address of the RESONANCE TEST command upon receipt of the next interrupt and program flow passes through the RESTORE STATUS AND ACCUMULATOR step 234 of FIG. 10A and RETURN FROM INTERRUPT at step 236. At this point in the flow, it should be recalled that the special TEST SEEK has been executed which excited broad spectrum vibrations in the disc drive structure (including the frequency to be tested) and the actuator is now in a nominal ON TRACK condition with any excited resonances being reflected in the SPE signal.

Discussion will now be directed to the steps necessary to characterize the resonant frequency or frequencies induced in the disc drive structure. Upon receipt of the next interrupt, the COMMAND PROCESSOR selects the starting address of the RESONANCE TEST command and program flow enters step 606 of FIG. 11C and proceeds to step 608, wherein resonance data is sampled and accumulated from the SPE. As a number of samples will be obtained and accumulated in order to detect and characterize the presence of the test resonant frequency, the iteration counter previously initialized in step 602 is toggled at step 610 and a decision is made in step 612 as to whether the desired number of iterations of the test sample and accumulate has occurred. In other words, the iteration counter is initially set to reflect the desired number of passes through the RESONANCE TEST flow, and during each pass through the flow a sample and accumulate operation occurs at block 608 on the SPE and the iteration counter is toggled (i.e., incremented or decremented as implemented) until the desired test duration is completed. It has been found that, for example, 64 such sample and accumulation operations have been adequate for certain resonant frequency detections and characterizations.

Once the desired test duration is completed, the result of the test is stored in the servo microprocessor RAM at step 614, a COMMAND COMPLETE is sent to the system microprocessor at step 615 and the mode control logic is set to select the FINE CONTROL mode at step 616 for the next interrupt. An example of a useful sample and accumulate operation for step 608 will be described in more detail below. It is important to note, however, that the specific sampling and accumulation methodology employed in order to detect and characterize the presence of resonant frequencies should not be considered limiting to the scope of the present invention, as it will be recognized by those of skill in the art that several such methodologies may be available and useful in detecting and characterizing the presence of a particular frequency within a signal.

Returning now to the system microprocessor flow of FIG. 7, it should be recalled that the servo microprocessor operations described immediately above occurred as a result of the TEST SEEK command issued by the system microprocessor to the servo microprocessor at step 532, and that the TEST SEEK command is only a single step in the logical flow of operations executed by the system microprocessor in response to the RESONANCE DETECTION TEST command of step 502 of the host computer system flow diagram of FIG. 6.

In FIG. 7, it will be recalled from the previous discussion hereinabove that the system microprocessor flow continues at step 536 in order to complete the system level RESONANCE DETECTION TEST command. In step 536, the system microprocessor issues the READ TEST SEEK RESULT command and once again checks for errors at step 538. The actions of the servo microprocessor in response to the READ TEST SEEK RESULT command will now be described.

Turning first to the COMMAND PROCESSOR flows of FIGS. 11A through 11C, it will be recalled that the termination of the previous servo microprocessor operation left the COMMAND PROCESSOR in the COMMAND RECEIVE mode, looping through steps 246 through 252 (and performing thermal calibrations), while the mode portion of the servo microprocessor ISR was left in the FINE CONTROL mode, looping through steps 354 through 360 (of FIG. 10A) and calling the COMMAND PROCESSOR with each interrupt (at step 232 of FIG. 10A).

Now, when the READ SEEK TEST RESULT command is received by the servo microprocessor the COMMAND RECEIVE flow gets the new command and parameters at step 298 of FIG. 11A and sets the COMMAND RECEIVED status in the status register at step 300 to notify the system microprocessor that the command has been received and recognized. On the next pass through the COMMAND PROCESSOR, the decoding of the READ SEEK TEST RESULT command forces the command logic at 242 to select the starting address of the SEND TEST RESULTS flow from the command table at 240 in FIG. 11A and program control is passed to the START SEND TEST RESULTS block 620 on FIG. 11C. At step 622, the servo microprocessor reads the results previously stored in step 614 from the RAM and at step 624 outputs these results to the interprocessor data bus 135, as shown in FIG. 4. The servo microprocessor then sends the COMMAND COMPLETE to the system microprocessor at step 626 which will, in turn, notify the system microprocessor to read the results from the interprocessor data bus 135. The servo microprocessor flow then continues at step 628 wherein the command code is set to COMMAND RECEIVE for the next interrupt.

Returning now to FIG. 7, the completion of the READ TEST RESULT SEEK command causes the flow to continue at step 540 where the test results are stored in the system microprocessor RAM (133 as shown in FIG. 4). Then, at step 542 of FIG. 7, the system microprocessor sends the COMMAND COMPLETE status to the host computer (124 in FIG. 4) via the host computer status bus 132. This completes the system microprocessor and servo microprocessor operations required for the system level RESONANCE DETECTION TEST command issued by the host computer system at step 502 in FIG. 6.

As shown in FIG. 6, the host computer proceeds at step 506 to request the results of the RESONANCE DETECTION TEST command by issuing READ TEST RESULTS command. This causes the system microprocessor to enter the flow diagram of FIG. 8, which, as it will be recalled, reads the test results from RAM at step 546, outputs the results on the host interface data bus at step 548, and notifies the host computer system of the availability of the test results on the host interface data bus by sending the COMMAND COMPLETE status at step 550. Once the host computer has retrieved the test results from the system microprocessor RAM, these results are evaluated at step 510 of FIG. 6, and the pass/fail decision is made based upon this evaluation as previously described hereinabove.

Before turning to a detailed discussion of the sample and accumulation methodology employed in a particular test which is an example of one aspect of the present invention, it will be beneficial to provide a graphical representation of an SPE signal in both a known good drive and a drive known to have a particular mechanical defect which in turn causes the faulty disc drive to exhibit a resonant frequency at the completion of the special TEST SEEK.

Figure 12:
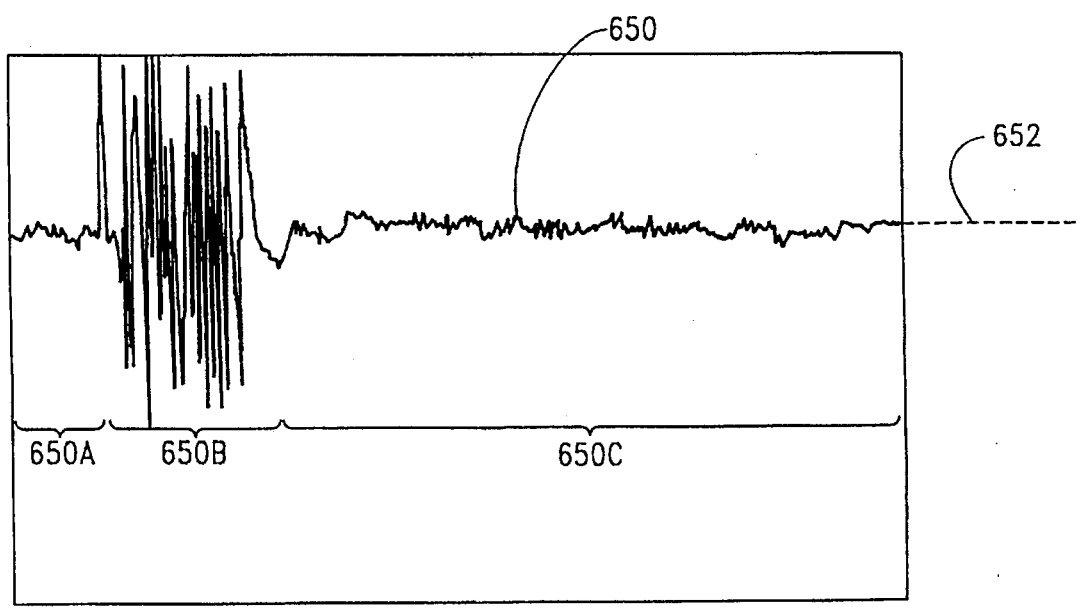
FIG. 12 is an oscilloscope pattern showing certain operational characteristics of a disc drive that incorporates known "good" mechanical components.

Turning to FIG. 12, shown therein is a graphical representation of a portion of a SPE signal 650 as it might be observed on an oscilloscope during the test process as herein described. FIG. 12 shows the SPE signal 650 with three components: a first portion 650A, during which the drive was in track following mode on a start track; a second portion 650B, during which the drive was performing the special test seek; and a third portion 650C, during which the drive was again in track following mode on the destination track for the test. As will be recognized by one skilled in the art, the SPE signal in both portions 650A and 650C exhibits relatively minimal deviation from true track center 652, indicating that no resonant frequencies were induced by the special TEST SEEK shown in portion 650B.

Figure 13:
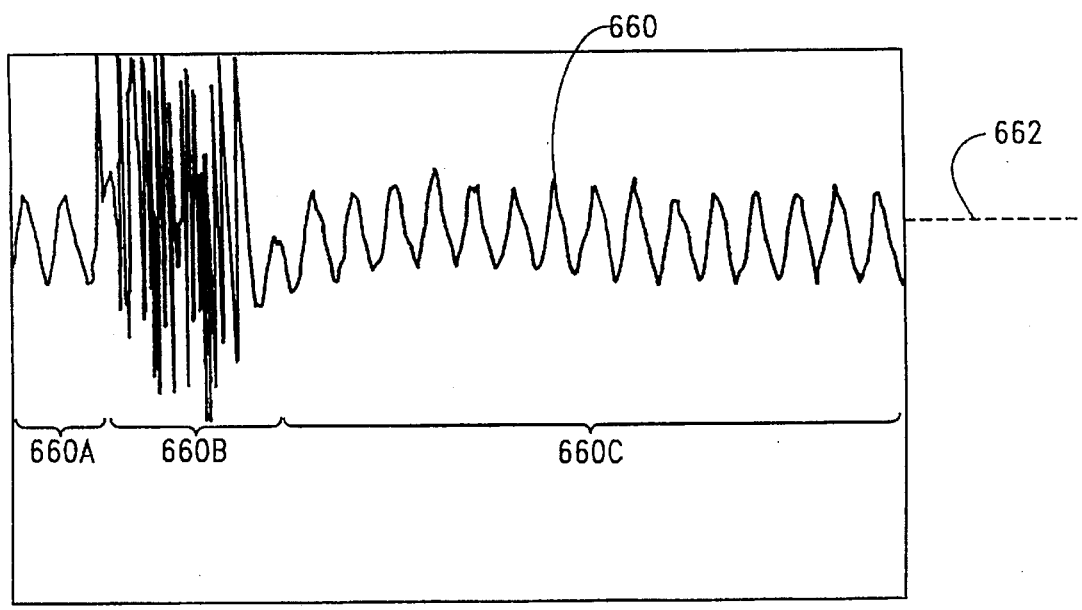
FIG. 13 is an oscilloscope pattern showing certain operational characteristics of a disc drive that exhibits a known flaw in the mechanical assembly.

By contrast, FIG. 13 shows an SPE signal 660 likewise having a first portion 660A, a second portion 660B and a third portion 660C, and comparison of section 660C (which is the SPE during track following after the special TEST SEEK of 660B) with section 650C of FIG. 12, it can be readily seen that such a resonant frequency of about 1.1 KHz exists on the SPE in FIG. 13. This resonant frequency was the result of a specific mechanical defect (e.g., actuator tilt) in the disc drive and the test methodology as discussed hereinabove could be useful in detecting and characterizing the presence of this frequency in terms of phase, magnitude and frequency in accordance with the present invention.

Turning now to a discussion of the SAMPLE AND ACCUMULATE RESONANCE DATA operation as described hereinabove with reference to step 608 of FIG. 11C, a Discrete Fourier Transform (DFT) has been found to be particularly useful in detecting and characterizing a resonant frequency induced into the actuator as a result of the special TEST SEEK. As will be recognized by those of skill in the art, a DFT is a sampling methodology that involves the accumulation of the following values:

$$A = \sum_n (SPE(n)) \times (\sin(nK)) \quad (1)$$

$$B = \sum_n (SPE(n)) \times (\cos(nK)) \quad (2)$$

where
number of samples over which DFT is taken
SPE(n) value of SPE at sample n
K=a constant, $2\pi fT$
f=test, or filtering frequency
T=sample period By selecting the number of samples n and the resonance frequency desired for detection and characterization, the values A and B above can thus be determined. Upon the calculation of the values A and B, the magnitude of the resonant frequency identified in the SPE signal can be determined as:

$$\text{magnitude=square root of } (A^2+B^2) \quad (3)$$

and the phase of the resonant frequency can be determined as:

$$\text{phase=tan}^{-1} (A/B) \quad (4)$$

By way of example, in order to test for the aforementioned 1.1 KHz resonant frequency that was found to correlate to an actuator tilt defect in a disc drive, the number of samples n was set to 65, the filtering frequency f was set to 1.1 KHz, and the sample period T was on the occurrence of every interrupt, or about every 42 microseconds. Previous empirical evaluation had resulted in a maximum acceptable threshold value for the magnitude of the resonant frequency. During testing, as described hereinabove the servo microprocessor was instructed to perform the resonance test, which resulted in the special TEST SEEK being performed in order to induce the resonant frequency in the actuator (and as reflected in the SPE signal).

Next, the program flow of FIG. 11C passed through the INITIALIZE RESONANCE TEST COMMAND routine, wherein the hardware and RAM were initialized in accordance with the above identified parameters (including the iteration counter that was set to count down 65 samples). The program continued through the RESONANCE TEST COMMAND routine, and the values of A and B were accumulated over the requisite number of samples. Upon timeout of the iteration counter, the results A and B were used to calculate a magnitude (in accordance with equation (3) above) and this magnitude was stored in RAM. Later in the execution of the host computer program of FIG. 6 at step 506, wherein a READ TEST RESULTS COMMAND was issued by the host computer (as described hereinabove), the values of the magnitude was reported to the host computer which performed the evaluation step at step 510 of FIG. 6. A preferred method of evaluation would include the comparison of the determined magnitude of the resonant frequency (according to equation 3 above) to the predetermined maximum acceptable threshold value, and then a decision at step 512 as to whether the measured magnitude was greater than the maximum acceptable threshold value. For a disc drive having an SPE signal similar to that as represented by the graph of FIG. 13 (a "bad" drive), in which case the test would fail, the error flag of step 514 would then be set, notifying the operator in a physical step (such as previously described including an output to a CRT display, the activation of an audio alarm, or the energizing of a test status LED), resulting in the rejection of the bad disc drive from the test environment.

It will be noted that the foregoing description of the present invention including the use of a DFT is by way of example rather than of limitation, in that it will be recognized that there are other possible data manipulation methodologies available that could be used to implement the sample and accumulate portion of the present invention.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for detecting for mechanical defects in a disc drive, the disc drive having a disc and an actuator adjacent the disc, the disc having a plurality of concentric data tracks, the disc drive capable of providing a servo position error signal indicative of the relative position of the actuator to a selected data track on the disc, the method comprising the steps of:

performing a test seek of the actuator to a selected data track to excite a resonant frequency in the actuator;

sampling and accumulating data from the servo position error signal to characterize the resonant frequency in the actuator;

evaluating the sampled and accumulated data from the servo position error signal; and setting an error flag at such times that the sampled and accumulated data from the servo position error signal exceeds a predetermined maximum acceptable threshold value to indicate the presence of a mechanical defect.

2. The method of claim 1, wherein the actuator further comprises an actuator coil and the step of performing a test seek of the actuator comprises the steps of:

identifying a destination data track;

applying current to the actuator coil to provide maximum acceleration of the actuator in a direction towards the destination track; and applying current to the actuator coil to provide maximum deceleration of the actuator and to cause the actuator to end the test seek over the destination track.

3. The method of claim 1, wherein the step of evaluating the sampled and accumulated data from the servo position error signal comprises the steps of:

determining an acceptable maximum threshold value; and comparing the data to the acceptable maximum threshold value.

4. The method of claim 1, wherein the step of setting an error flag comprises setting a bit in RAM indicative of a failure condition.

5. An improved apparatus for detecting mechanical defects in a disc drive, the disc drive having a disc and an actuator adjacent the disc, the disc having a plurality of concentric data tracks, the disc drive capable of providing a servo position error signal indicative of the relative position of the actuator to a selected data track on the disc, the apparatus comprising:

means for performing a test seek of the actuator to a selected data track to excite a resonant frequency in the actuator;

means for sampling and accumulating data from the servo position error signal to characterize the resonant frequency in the actuator;

means for evaluating the sampled and accumulated data from the servo position error signal; and means for setting an error flag at such times that the sampled and accumulated data from the servo position error signal exceeds a predetermined maximum acceptable threshold value to indicate the presence of a mechanical defect.

6. The improved apparatus of claim 5 wherein the actuator further comprises an actuator coil and the means for performing a test seek of the actuator comprises:

means for identifying a destination data track;

means for applying current to the actuator coil to provide maximum acceleration of the actuator in a direction towards the destination track; and means for applying current to the actuator coil to provide maximum deceleration of the actuator and to cause the actuator to end the test seek over the destination track.

7. The improved apparatus of claim 5 Wherein the means for evaluating the sampled and accumulated data from the servo position error signal comprises:

means for determining an acceptable maximum threshold value; and means for comparing the data to the acceptable maximum threshold value.

8. The improved apparatus of claim 5 wherein the means for setting an error flag comprises means for setting a bit in RAM indicative of a failure condition.

9. In a disc drive having a mechanical structure including a disc and an actuator adjacent the disc, the actuator having a transducer positionably adjacent any selected one of a plurality of tracks on the disc surface, the disc drive having a servo control circuit operable as a servo loop for generating a correction signal in response to an incoming servo position error signal received from the transducer, the servo position error signal indicative of the relative position of the transducer to the selected track, the correction signal controlling the output of current from an actuator driver to an actuator coil to position the transducer with respect to the selected track, wherein the servo position error signal is obtained from the transducer in each of a succession of time intervals, a method for detecting mechanical defects in the disc drive comprising the steps of:

performing a test seek from an initial track to the selected track, the test seek comprising initially accelerating the actuator from the initial track and subsequently decelerating the actuator towards the selected track to excite a resonant vibration in the mechanical structure of the disc drive;

sampling and accumulating data from the servo position error signal to characterize the magnitude of a resonant signal in the servo position error signal, the resonant signal generated by the resonant vibration of the mechanical structure of the disc drive; and providing an indication when the characterized magnitude of the resonant signal exceeds a preselected limit to indicate the presence of a mechanical defect.

10. The method of claim 9, wherein the step of sampling and accumulating data comprises the step of performing a discrete fourier transform of the servo position error signal over a preselected number of time intervals.

11. The method of claim 9, wherein the step of performing a test seek further comprises applying current to the actuator coil to provide maximum acceleration of the actuator and subsequently applying current to the actuator coil to provide maximum deceleration of the actuator during the test seek.

12. In a disc drive having a disc and an actuator adjacent the disc, the actuator having a coil and a transducer, the disc drive further having a servo control circuit operable as a servo loop for generating a correction signal to position the transducer with respect to the disc in response to an incoming servo position error signal received from the transducer, the servo position error signal indicative of the relative position of the transducer to a selected track on the disc, the correction signal controlling the output of current from an actuator driver to an actuator coil, wherein the servo position error signal is obtained from the transducer in each of a succession of time intervals, the improvement comprising:

test seek means for performing a test seek of the actuator from an initial track to the selected track, the test seek comprising maximum acceleration of the actuator from the initial track and subsequent maximum deceleration of the actuator towards the selected track to excite a resonant vibration in the disc drive;

characterization means for characterizing the magnitude of a resonant signal in the servo position error signal, the resonant signal generated by the resonant vibration of the mechanical structure of the disc drive; and indication means for indicating the characterized magnitude of the resonant signal exceeds a preselected limit to indicate the presence of a mechanical defect in the disc drive.

13. The improved disc drive of claim 12, wherein the characterization means uses a discrete fourier transform to characterize the magnitude of the resonant signal by sampling and accumulating data from the resonant signal over preselected number of said time intervals.

\* \* \* \* \*

UNITED STATES PATENT AND TRADEMARK OFFICE
CERTIFICATE OF CORRECTION

PATENT NO. : 5,661,615
DATED : August 26, 1997
INVENTOR(S) : David C. Waugh, et. al.

It is certified that error appears in the above-identified patent and that said Letters Patent is hereby corrected as shown below:

Column 11, line 49, delete "chaff" and insert --chart--

Column 13, line 4, delete "staffing" and insert --starting--

Column 21, line 20, delete "number of samples over which DFT is taken" and insert --n = number of samples over which DFT is taken--

Column 21, line 21, delete "SPE(n) value of SPE at sample n" and insert --SPE(n) = value of SPE at sample n--

Column 23, line 30, delete "Wherein" and insert --wherein--

Signed and Sealed this

Twenty-fourth Day of August, 1999

Attest:

*Attesting Officer*

Q. TODD DICKINSON

*Acting Commissioner of Patents and Trademarks*